United States Patent
Taira et al.

(10) Patent No.: US 10,255,471 B2
(45) Date of Patent: Apr. 9, 2019

(54) CODE RECOGNITION DEVICE

(71) Applicant: TOSHIBA TEC KABUSHIKI KAISHA, Shinagawa-ku, Tokyo (JP)

(72) Inventors: Kazuki Taira, Ota Tokyo (JP); Norimasa Ariga, Izunokuni Shizuoka (JP); Masaaki Yasunaga, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 15/451,642

(22) Filed: Mar. 7, 2017

(65) Prior Publication Data
US 2017/0293788 A1     Oct. 12, 2017

(30) Foreign Application Priority Data

Apr. 7, 2016  (JP) ................. 2016-077536

(51) Int. Cl.
| G06K 9/18 | (2006.01) |
| G06K 7/14 | (2006.01) |
| G06K 9/20 | (2006.01) |
| G06K 9/22 | (2006.01) |
| G06K 7/10 | (2006.01) |

(52) U.S. Cl.
CPC ....... G06K 7/1443 (2013.01); G06K 7/10722 (2013.01); G06K 9/2054 (2013.01); G06K 9/228 (2013.01)

(58) Field of Classification Search
USPC ....................................................... 382/182
See application file for complete search history.

(56) References Cited

U.S. PATENT DOCUMENTS

| 5,880,451 A | 3/1999 | Smith et al. |
| 8,744,176 B2 | 6/2014 | Feris et al. |
| 2004/0218783 A1 | 11/2004 | Mampe et al. |
| 2005/0051627 A1* | 3/2005 | Matushima ........ G06K 7/10881 235/454 |
| 2007/0069028 A1 | 3/2007 | Nemet |
| 2009/0200379 A1* | 8/2009 | Kuyper-Hammond ...................... G06K 19/06028 235/462.1 |
| 2010/0214620 A1* | 8/2010 | Ishiguro ............. H04N 1/40062 358/3.28 |

(Continued)

FOREIGN PATENT DOCUMENTS

EP         0978087         2/2000

OTHER PUBLICATIONS

Extended European Search Report for European Patent Application No. 17162220.2 dated Aug. 29, 2017.

*Primary Examiner* — Jerome Grant, II
(74) *Attorney, Agent, or Firm* — Amin, Turocy & Watson LLP

(57) ABSTRACT

According to one embodiment, a code recognition device includes a reader, a processor for region detection, for first extraction, and for second extraction. The reader photographs a code image. The processor detects a code region and a letter region included in the code image from the code image photographed by the reader. The processor extracts first code information indicating the code image from the code region. The processor also extracts second code information indicating the code image from the letter region.

14 Claims, 17 Drawing Sheets

(56) References Cited

U.S. PATENT DOCUMENTS

| | | | |
|---|---|---|---|
| 2012/0229873 A1* | 9/2012 | Itoh | H04N 1/00708 |
| | | | 358/449 |
| 2013/0215475 A1* | 8/2013 | Noguchi | H04N 1/32106 |
| | | | 358/448 |
| 2014/0017822 A1* | 1/2014 | Sakai | H01L 22/10 |
| | | | 438/15 |
| 2014/0022406 A1* | 1/2014 | Baheti | G06T 3/608 |
| | | | 348/222.1 |
| 2015/0029339 A1 | 1/2015 | Kobres et al. | |
| 2015/0034724 A1* | 2/2015 | He | G06K 7/1443 |
| | | | 235/462.08 |
| 2015/0339508 A1* | 11/2015 | Hosokane | G06K 19/06037 |
| | | | 235/462.09 |
| 2016/0057490 A1* | 2/2016 | Besehanic | H04N 21/44213 |
| | | | 725/19 |
| 2016/0180884 A1* | 6/2016 | Nowak | H04N 9/8205 |
| | | | 386/201 |
| 2016/0218803 A1* | 7/2016 | Zhi | H04B 7/0413 |
| 2016/0300115 A1 | 10/2016 | Yasunaga et al. | |
| 2016/0300116 A1 | 10/2016 | Yasunaga et al. | |
| 2016/0381283 A1 | 12/2016 | Ariga et al. | |
| 2017/0364723 A1* | 12/2017 | Inoue | G06K 7/1443 |
| 2018/0065359 A1* | 3/2018 | Yamaguchi | B41J 2/04508 |

\* cited by examiner

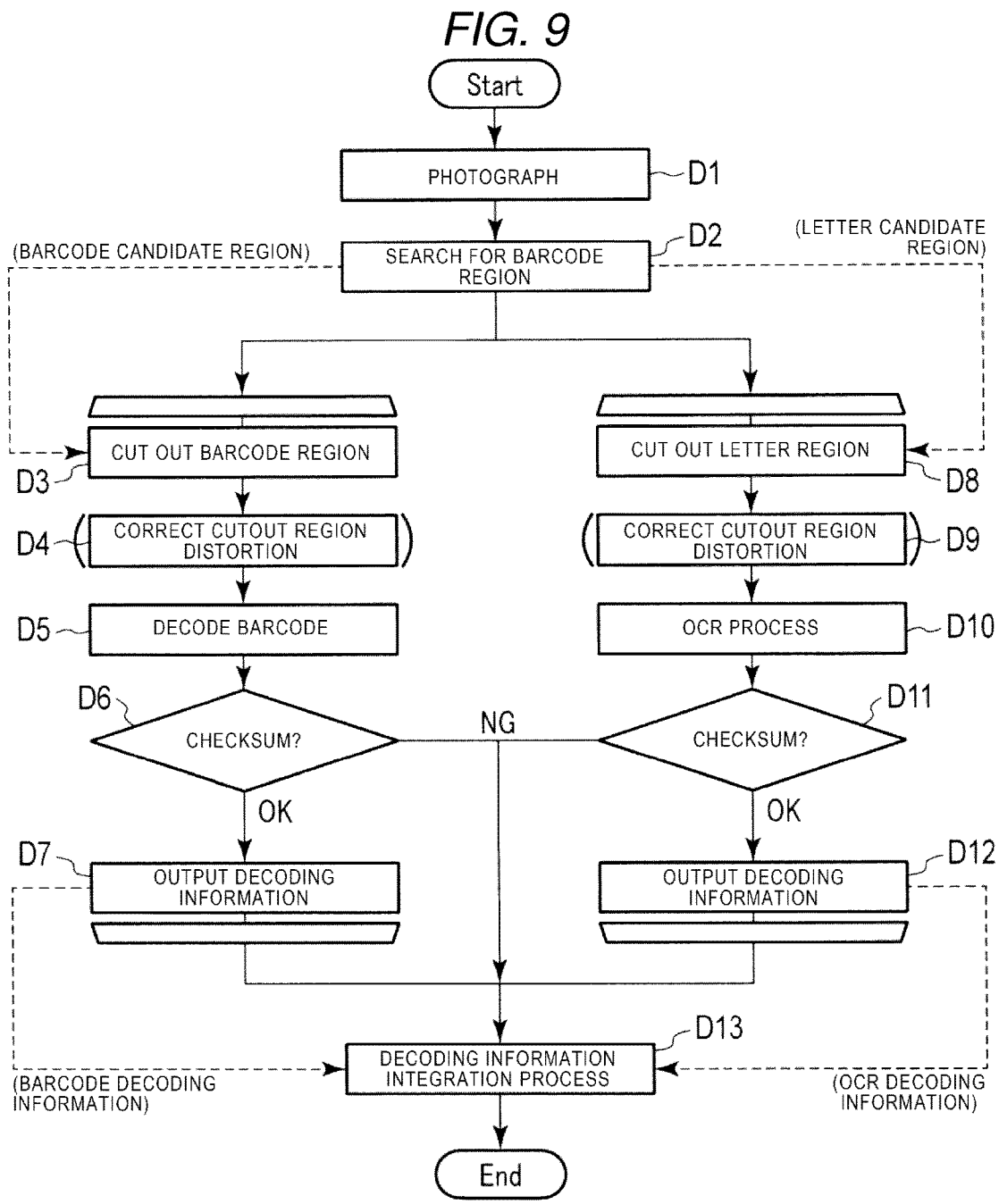

⇒ "4912345678904"

BARCODE DECODING PROCESS

⇒ "4912345678904"

OCR PROCESS

CODE RECOGNITION DEVICE

CROSS-REFERENCE TO RELATED APPLICATION

This application is based upon and claims the benefit of priority from Japanese Patent Application No. 2016-77536, filed Apr. 7, 2016, the entire contents of which are incorporated herein by reference.

FIELD

Embodiments described herein relate generally to a code recognition device.

BACKGROUND

There are requests for efficiently reading barcode information from a plurality of barcodes disposed widely in spaces of warehouses or shops, for example, on commodity shelves. In general, when barcode information is read from barcodes disposed in a plurality of points, it is necessary to hold a reading unit of a barcode recognition device to an individual barcode. For this reason, it takes some time to read all of many pieces of barcode information.

On the other hand, there are methods of photographing a region including a plurality of barcodes and collectively reading barcode information regarding the plurality of barcodes from the photographed image. In the methods, it is necessary to perform photographing from a location distant from barcodes and obtain an image from which the barcodes can be recognized. Therefore, when reading units use 2-dimensional image sensors, it is necessary for light reception elements to have high resolution and large areas. However, in barcode recognition devices that includes reading units with no sufficient resolution, quality of barcodes in photographed images is poor and barcode information may not be recognized in some cases. Since photographing is performed from positions distant from barcodes, images with good quality may not be photographed depending on situations at the time of the photographing and barcode information may not be recognized from the images in some cases.

DESCRIPTION OF THE DRAWINGS

FIG. 9 is a flowchart illustrating a fourth method of reading a barcode with the barcode recognition device according to the first embodiment.

DETAILED DESCRIPTION

An object of the invention is to provide a code recognition device capable of detecting barcodes disposed at a plurality of points from a distant position and efficiently reading barcode information.

In general, according to one embodiment, a code recognition device includes a reader, a processor for region detection, for first extraction, and for second extraction. The reader photographs a code image. The processor detects a code region and a letter region included in the code image from the code image photographed by the reader. The processor extracts first code information indicating the code image from the code region. The processor also extracts second code information indicating the code image from the letter region.

Hereinafter, embodiments will be described with reference to the drawings.

First Embodiment

Figure 1:
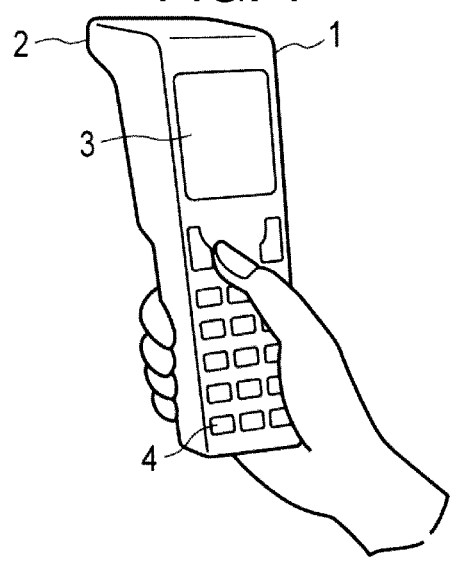
FIG. 1 is an external view illustrating a barcode recognition device according to a first embodiment.

FIG. 1 is an external view illustrating a barcode recognition device 1 according to a first embodiment. The barcode recognition device 1 illustrated in FIG. 1 is a so-called handheld terminal which a user holds and operates with his or her hand. The barcode recognition device 1 is a device that optically detects a code attached to, for example, a commodity shelf or a commodity in a space such as a warehouse or a shop and reads code information indicating the code. In the first embodiment, for example, the description will be made assuming that a barcode is set as a code and barcode information indicating the barcode is read. In general, a barcode includes a banded pattern (barcode pattern) formed by a plurality of striped lines with different thicknesses and a letter string (number string) indicating barcode information representing a barcode pattern. The barcode recognition device 1 is not limited to a barcode, but may be recognized setting various codes represented by a combination of 2-dimensional code and a geometric figure as a target.

The barcode recognition device 1 includes a barcode reading unit 2 that photographs a barcode, a display unit 3 that displays a reading state of a barcode, operation information, a reading result, and the like, and an input unit 4 that inputs an operation command or the like. An operator can hold the casing of the barcode recognition device 1, heads the barcode reading unit 2 toward a photographing range (photographed region) including a barcode which is a reading target, and gives an instruction to photograph the photographing range (read a barcode) operating the input unit 4. The barcode recognition device 1 can collectively read a plurality of barcodes, for example, setting the plurality of barcodes attached to display positions of a plurality of commodities as a photographing range when the commodities are displayed on commodity shelves or the like.

Figure 2:
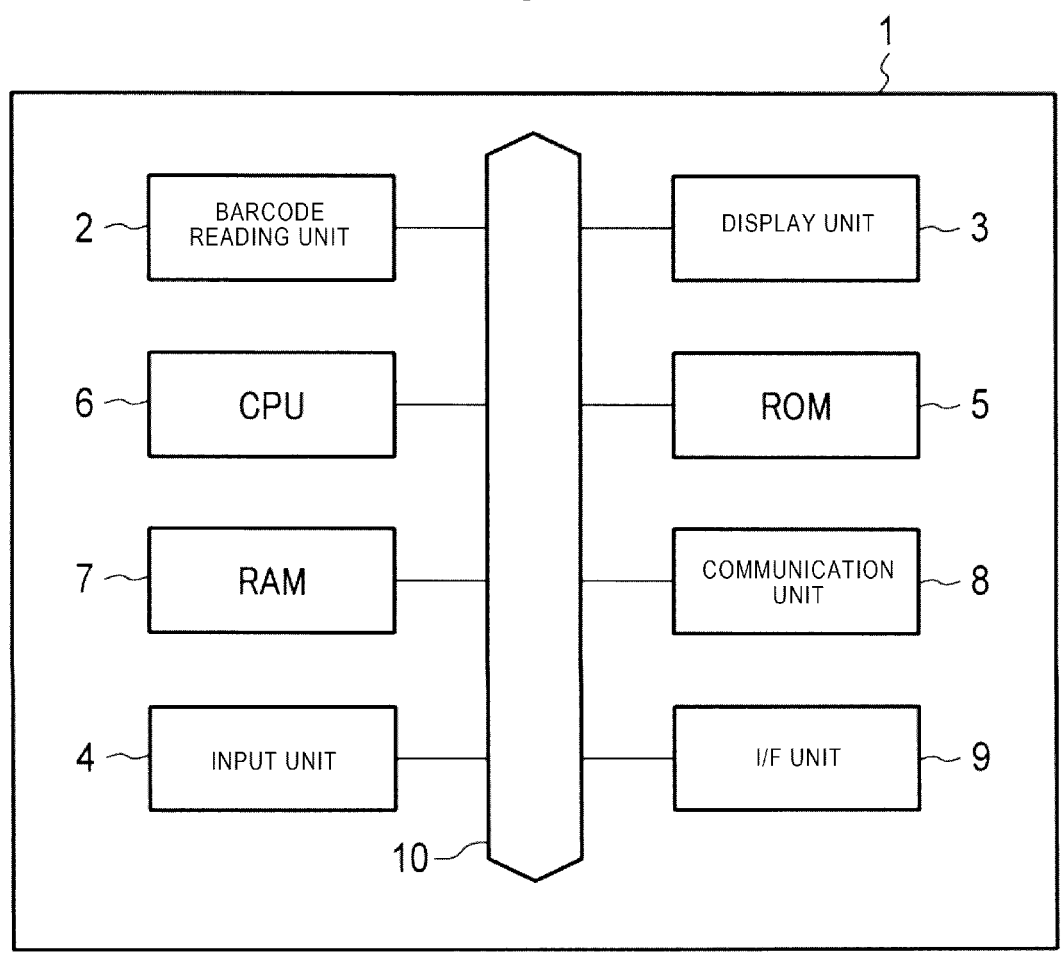
FIG. 2 is a block diagram illustrating a device configuration of the barcode recognition device according to the first embodiment.

FIG. 2 is a block diagram illustrating a device configuration of the barcode recognition device 1 according to the first embodiment. As illustrated in FIG. 2, the barcode reading unit 2, the display unit 3, and the input unit 4 are connected to each other via a data bus 10. Further, a ROM 5 that records a program or data, a RAM 7 that temporarily records information, a CPU 6 that is a central processing processor and performs an arithmetic process on a program, a communication unit 8 that performs communication with the outside of the device, and an I/F unit 9 that is a connection interface (I/F) with the outside of the device are connected to each other via the data bus 10. A program recorded on the ROM 5 includes a barcode recognition program that reads barcode information from an image photographed by the barcode reading unit 2. The CPU 6 executes the barcode recognition program to realize a region detection function of detecting a barcode region and a letter region included in a barcode from an image photographed by the barcode reading unit 2, a first extraction function of extracting barcode information from the barcode region, and a second extraction function of extracting barcode information from the letter region.

Figure 3:
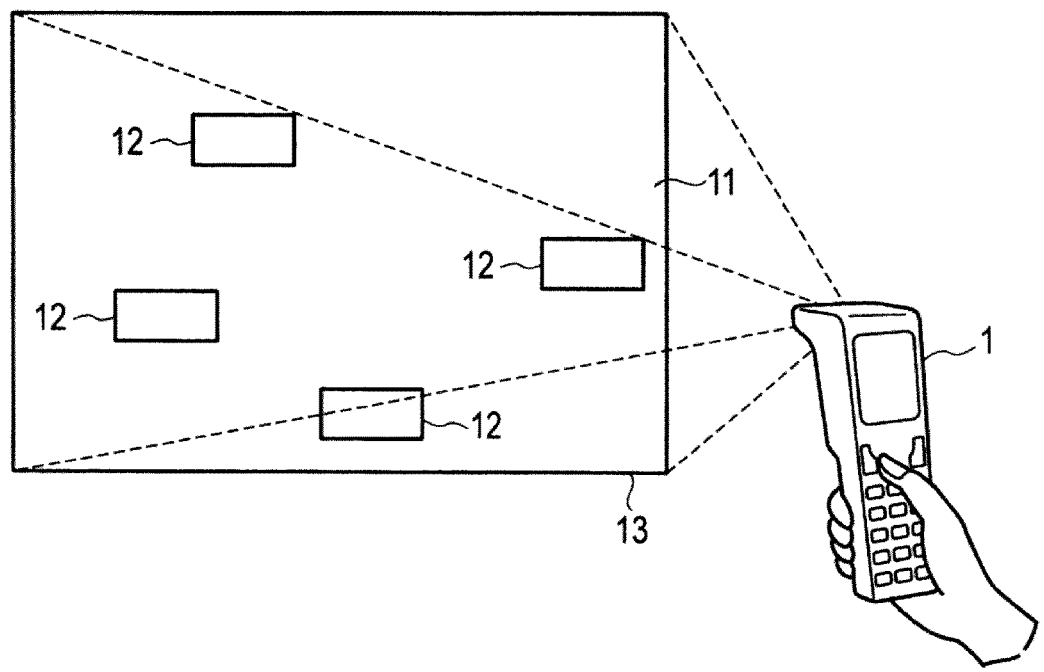
FIG. 3 is a diagram illustrating a reading range (photographed region) by a barcode reading unit according to the first embodiment.

FIG. 3 is a diagram illustrating a reading range (photographed region 11) by the barcode reading unit 2 when a barcode is read using the barcode recognition device 1 according to the first embodiment. The barcode recognition device 1 performs barcode reading with a photographing direction of the barcode reading unit 2 toward the barcode 12 at a position distant from the barcode 12 disposed in a space. The photographed region 11 by the barcode reading unit 2 can include the plurality of barcodes 12 disposed in the space. A photographing region boundary 13 indicating the range of the photographed region 11 is explicitly indicated by a marker such as a laser emitted from the barcode recognition device 1 so that a user can easily determine the photographing region boundary 13.

Figure 4:
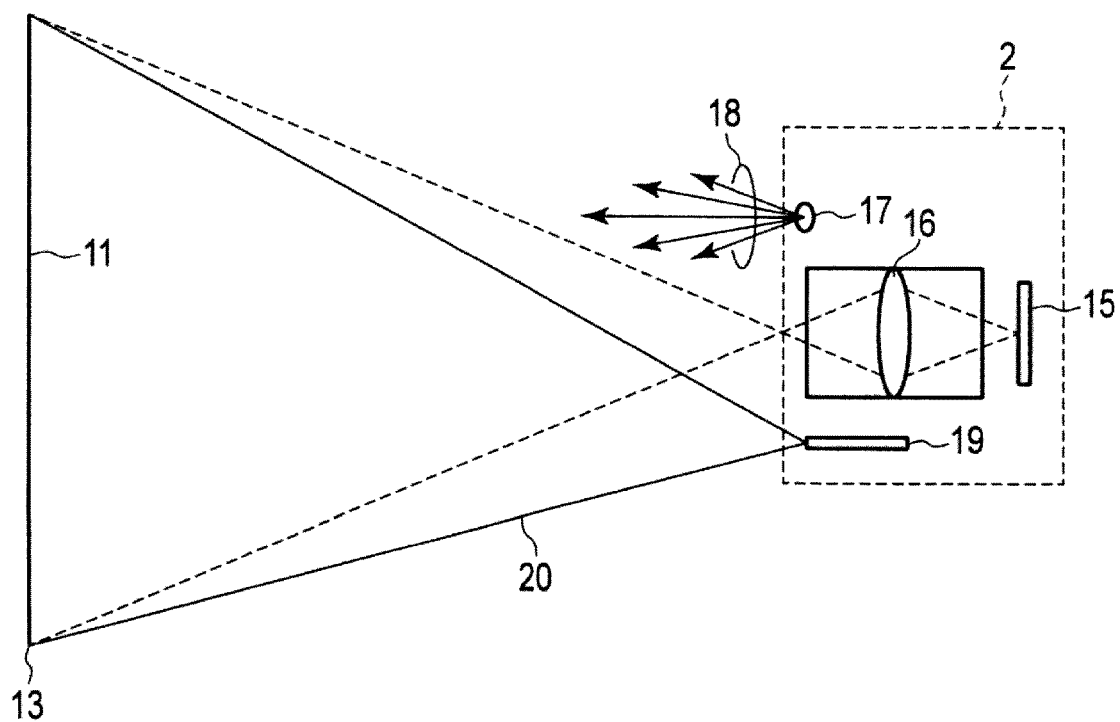
FIG. 4 is a diagram schematically illustrating a detailed configuration of the barcode reading unit according to the first embodiment.

FIG. 4 is a diagram schematically illustrating a detailed configuration of the barcode reading unit 2 according to the first embodiment. The barcode reading unit 2 includes, for example, a photographing lens 16, a 2-dimensional image sensor 15, an illumination LED light source 17, and a laser pointer 19 to perform photographing. The illumination LED light source 17 outputs, for example, near infrared light (IR light) 18 to illuminate the photographed region 11 with illuminance necessary and sufficient for the photographing. The laser pointer 19 emits visible laser light 20 such as red in the photographing direction by the barcode reading unit 2 and displays the photographing region boundary 13 so that the user can ascertain the range of the photographed region 11.

Figure 5A:
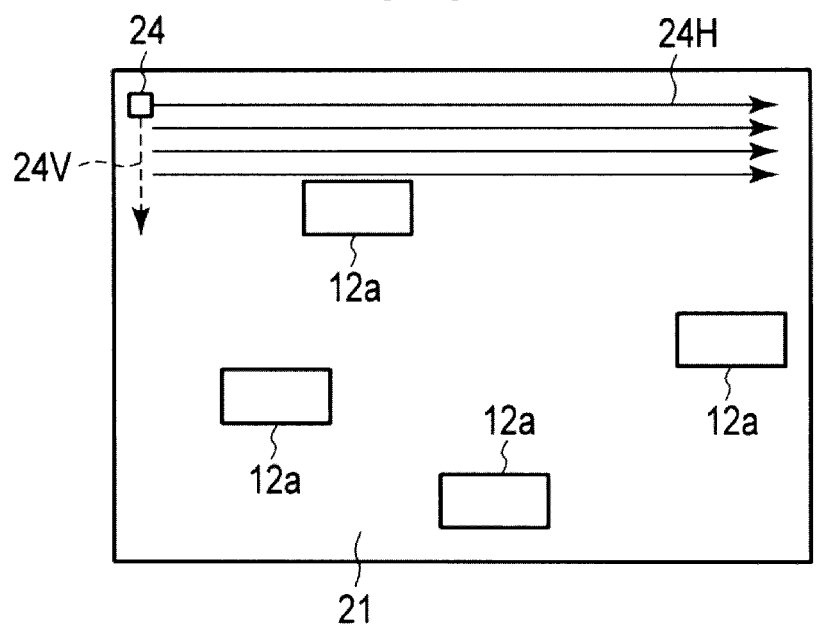
FIGS. 5A and 5B are diagrams schematically illustrating a method of searching for barcode images equivalent to barcodes included in a photographed image according to the first embodiment.
Figure 5B:
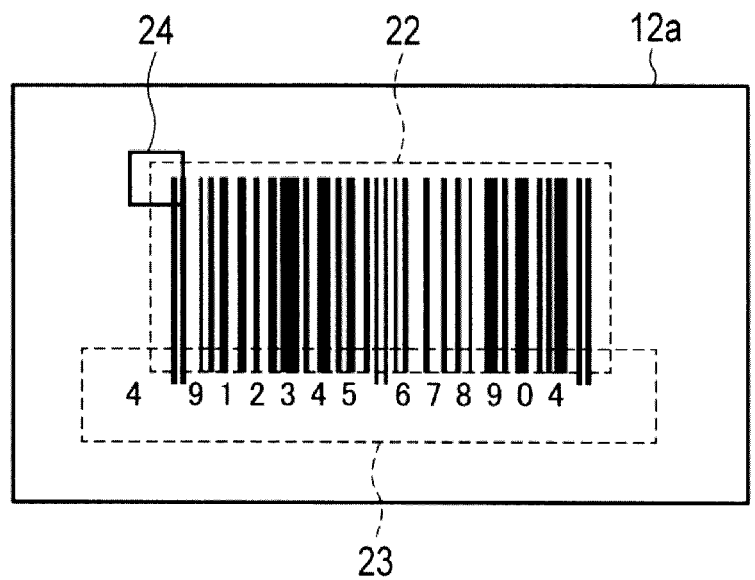

FIGS. 5A and 5B are diagrams schematically illustrating a method of searching for barcode images 12a (code images) equivalent to the barcodes 12 included in a photographed image 21 photographed by the barcode reading unit 2 according to the first embodiment. The photographed image 21 is photographed with a resolution at which the barcode images 12a equivalent to the barcodes 12 can be acquired, for example, about 200 dpi or more. The barcode image 12a includes a banded pattern (barcode pattern) formed by a plurality of striped lines with different thicknesses.

As illustrated in FIG. 5A, the CPU 6 sets a search region 24 with a small area with respect to the photographed image 21 and sequentially scans the photographed image 21 in a horizontal direction 24H and a vertical direction 24V. Here, the barcode is, for example, an European Article Number (EAN) code or a Japanese Article Number (JAN) code. It is assumed that a 1-dimensional barcode (barcode pattern) and a number string (decoding information) represented by the 1-dimensional barcode are written together. The number string is assumed to include checksum for confirming right or wrong.

The CPU 6 performs scanning in accordance with a search region 24 to extract a barcode region 22 equivalent to a 1-dimensional barcode (barcode pattern) included in the barcode image 12a and a letter region 23 equivalent to a number string, as illustrated in FIG. 5B. A detection function (detector) of detecting candidates for the barcode region 22 and the letter region 23 is configured to include an identifier and a dictionary generated by training data and non-training data using a machine learning technology by selecting feature points describing feature patterns of barcodes and letters. A detection function (detector) of detecting candidates for the barcode region 22 can also be configured to perform detection with a rule in which no data training is performed by focusing on a period of vertical and horizontal components of a pattern. In the scanning in accordance with the search region 24, regions extracted as candidates for the barcode region 22 or candidates for the letter region 23 are combined in consideration of a barcode pattern and a number string direction and are extracted as the candidates for the barcode region 22 and the candidates for the letter region 23 along with position information (coordinate position) in the photographed image 21.

Next, an operation of the barcode recognition device 1 according to the first embodiment will be described with reference to the flowcharts illustrated in FIGS. 6, 7, 8, and 9.

Figure 6:
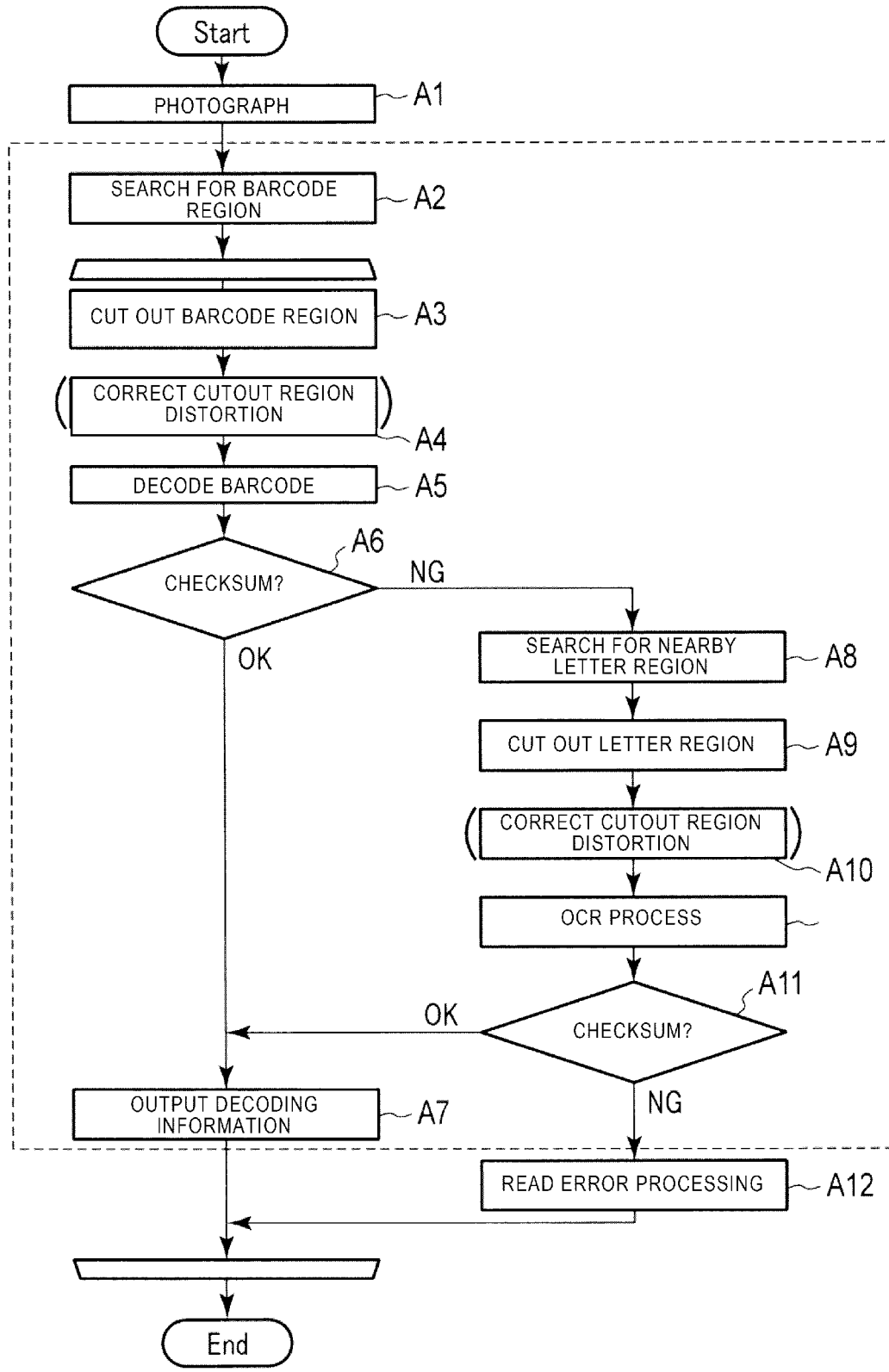
FIG. 6 is a flowchart illustrating a first method of reading a barcode with the barcode recognition device according to the first embodiment.

FIG. 6 is a flowchart illustrating a first method of reading a barcode with the barcode recognition device 1 according to the first embodiment.

The CPU 6 causes the barcode reading unit 2 to photograph the photographed region 11 in response to an operation by the user (Act A1). The CPU 6 acquires the photographed image 21 illustrated in FIG. 5 through the photographing of the barcode reading unit 2 and searches for the barcode region 22 (Act A2).

Next, the CPU 6 cuts out the barcode region 22 as a rectangle image by further performing detailed search on a region extracted as a candidate for the barcode region 22 (barcode candidate region) through nearest neighbor search (Act A3). When the photographed image 21 is photographed obliquely and the barcode region 22 is distorted geometrically, cutout region distortion correction may be performed through projective transformation (Act A4). Thereafter, the CPU 6 performs a decoding process on the barcode pattern included in the barcode region 22 (Act A5). Here, when the barcode pattern can be decoded according to a predetermined barcode protocol, the CPU 6 confirms checksum (OK in Act A6), and then outputs decoding information (barcode information) along with positional information of the barcode (Act A7).

Conversely, when the decoding fails in the decoding process on the barcode pattern (NG in Act A6), the CPU 6 searches for nearby letter region candidates near the vicinity of the barcode region 22 (Act A8) and cuts out the nearby letter region candidates as candidates (letter candidate regions) for the letter region 23 (Act A9). The CPU 6 may perform a cutout region distortion correction process to correct geometric distortion of a letter candidate region as necessary, as in the distortion correction of the barcode region 22 (Act A10).

The CPU 6 performs a process of removing the barcode pattern from the letter region candidate and then performs an OCR process to recognize a letter string in the letter region candidate (Act A10). That is, the CPU 6 attempts to acquire a number string indicating barcode information. When the barcode protocol is satisfied as a result obtained by performing the checksum on the number string obtained through the OCR process similarly with decoding on a barcode pattern (OK in Act A11), the CPU 6 outputs the obtained number string along with the positional information as decoding information (barcode information) of the barcode (Act A7). When the decoding is determined to fail as a result obtained by performing the checksum (NG in Act A11), the CPU 6 performs read error processing (Act A12).

When the CPU 6 searches for the plurality of barcode images 12a in the photographed image 21, the CPU 6 repeatedly performs the above-described processes (Acts A2 to A7) on the barcode images 12a. Thus, the barcode recognition device 1 can collectively read the barcode information from the plurality of barcodes 12 from the photographed image 21 once photographed by the barcode reading unit 2.

Figure 10A:
FIGS. 10A and 10B are diagrams illustrating examples of barcode images according to the first embodiment.
Figure 10B:
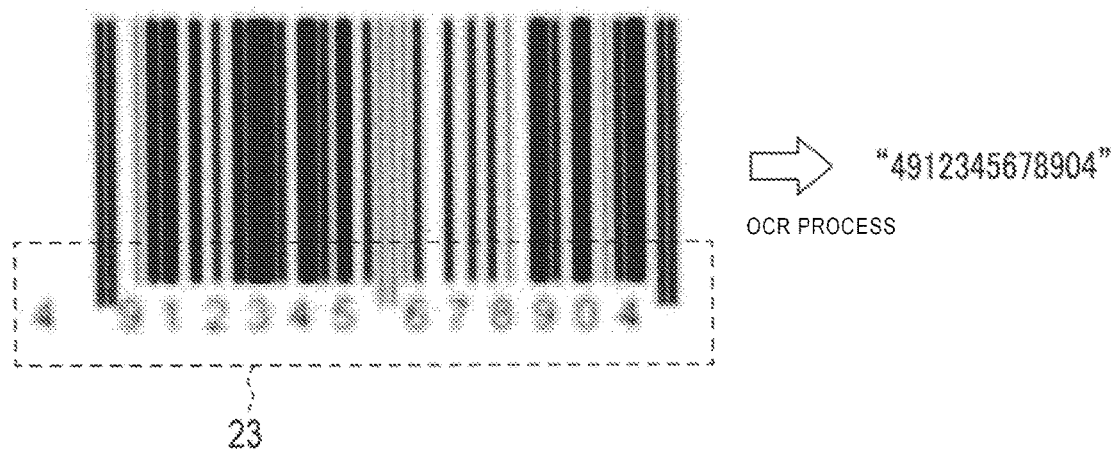

When the barcode pattern of the barcode region 22 is clear, for example, as illustrated in FIG. 10A, the barcode information can be output through the decoding process on the barcode pattern by performing the above-described processes. Conversely, even when the barcode pattern of the barcode region 22 has an insufficient resolution or definition in the decoding process, as illustrated in FIG. 10B, the barcode information can be accurately acquired through the OCR process performed on the letter region 23 which is a target. In general, a resolution necessary to decode the barcode may be lower than a resolution necessary for OCR of the number string in some cases. Therefore, when the barcode 12 is photographed with a resolution or a definition at which decoding may not be performed, for example, even when the photographed region 11 is photographed at a position distant up to the barcode, correct barcode information can be acquired. Alternatively, even when the image sensor 15 with a high resolution and a large area is not mounted on the barcode reading unit 2, the barcode 12 can be read. Therefore, the barcode recognition device 1 can be manufactured at low cost.

In this way, in the first method of the first embodiment, by reading the number string (letter string) representing information equal to barcode information and disposed near the vicinity of the barcode region 22 through the OCR process, the number string can be complementarily used when the decoding information may not be acquired from the barcode region 22. Thus, it is possible to detect barcodes disposed at a plurality of points from distant positions and efficiently read the barcode information. In the first embodiment, the barcode information can be read similarly in accordance with second to fourth methods to be described below.

Figure 7:
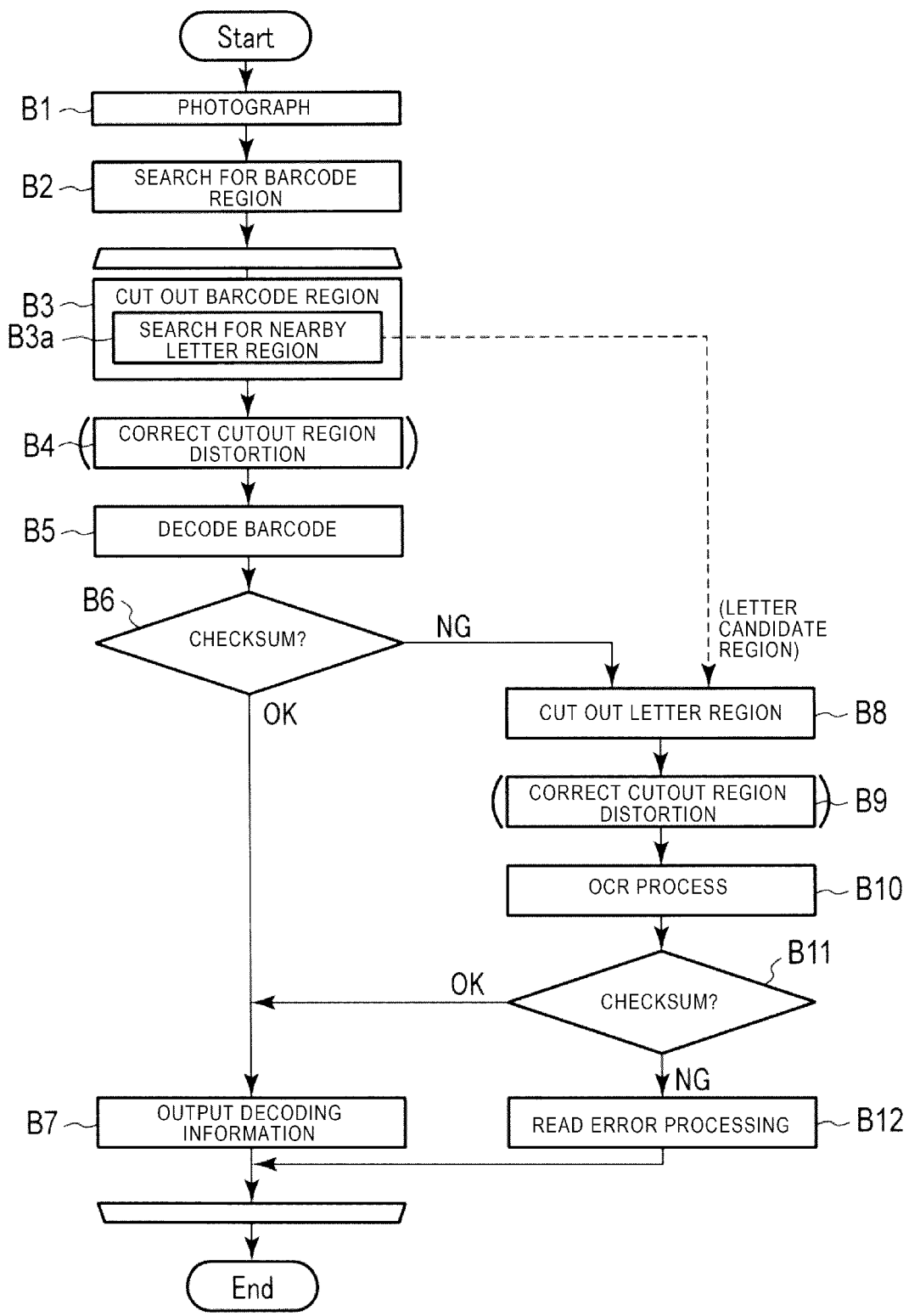
FIG. 7 is a flowchart illustrating a second method of reading a barcode with the barcode recognition device according to the first embodiment.

FIG. 7 is a flowchart illustrating a second method of reading a barcode with the barcode recognition device 1 according to the first embodiment. In the second method, different processes from those of the first method illustrated in FIG. 6 will be described.

In the first method, the nearby letter region candidates present near the vicinity of the barcode region 22 are searched for when the decoding process for the barcode pattern (the barcode region 22) fails. In the second method, when candidates for the barcode region 22 (barcode candidate regions) are cut out (Act B3), nearby letter regions present near the vicinity of the barcode region 22 are searched for (Act B3a) and a process of confirming a region which not include letter region candidates as the barcode region 22 and cutting out the region is performed. At this time, the CPU 6 temporarily records information regarding a position (coordinates) and a size indicating the detected letter candidate region in the RAM 7 (memory buffer).

As in the first method, when the decoding process for the barcode region 22 fails (NG in Act B6), the CPU 6 performs a letter region cutting process of cutting out the letter candidate region using the information regarding the position and the size recorded on the RAM 7 (Act B8). In the second method, the process of searching for the periphery of the barcode region 22 is not repeatedly performed when the barcode region 22 is cut out (Act B3) and the letter region 23 is cut out (Act B8). Therefore, it is possible to realize the barcode recognition process more efficiently.

Figure 8:
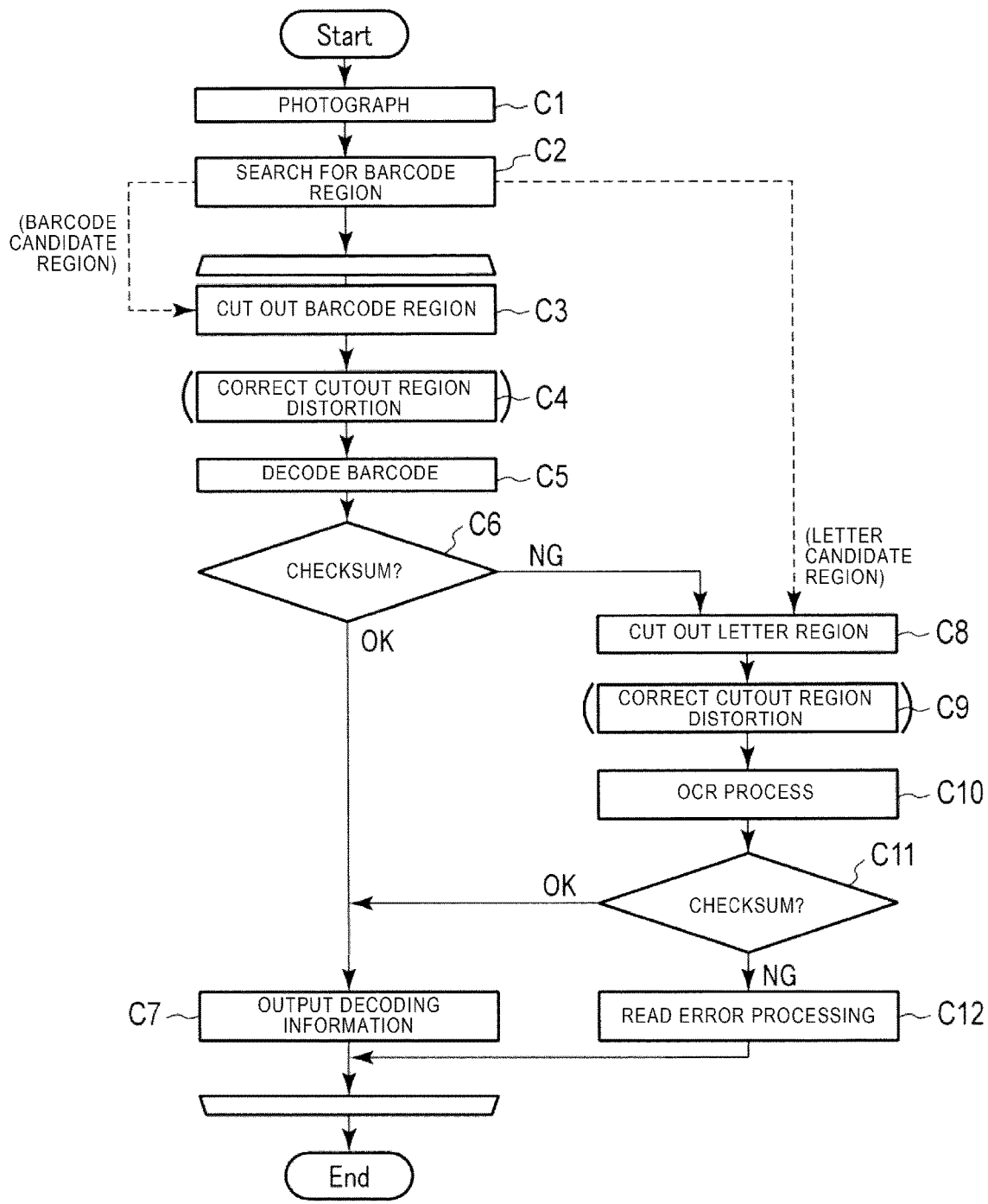
FIG. 8 is a flowchart illustrating a third method of reading a barcode with the barcode recognition device according to the first embodiment.

FIG. 8 is a flowchart illustrating a third method of reading a barcode with the barcode recognition device 1 according to the first embodiment. In the third method, different processes from those of the first method illustrated in FIG. 6 will be described.

In the third method, after the photographed image 21 photographed by the barcode reading unit 2 is acquired, an image region searching process is performed on the entire screen of the photographed image 21 (Act C3) and both of the barcode region 22 and the letter region 23 are collective searched for. The CPU 6 records information regarding the positions and the sizes of the barcode candidate region and the letter candidate region detected through the image region searching process on the RAM 7 (memory buffer).

The CPU 6 cuts out the barcode region 22 using the information regarding the position and the size of the barcode candidate region recorded on the RAM 7 when the barcode region 22 is cut out (Act C3). The CPU 6 cuts out the letter region 23 using the information regarding the position and the size of the letter candidate region recorded on the RAM 7 when the letter region 23 is cut out (Act C8).

In the third method, since the information regarding the positions and the sizes of both the barcode candidate region and the letter candidate region detected through the searching performed once on the entire screen is collectively recorded, it is possible to reduce the number of the searching process in the screen, and thus realize the more efficient barcode recognition process.

FIG. 9 is a flowchart illustrating a fourth method of reading a barcode with the barcode recognition device 1 according to the first embodiment.

In the fourth method, a process of outputting decoding information (barcode information) from cutting of the barcode region 22 (Acts D3 to D7) and a process of outputting decoding information (barcode information) from cutting of the letter region 23 (Acts D8 to D12) are performed in parallel, and decoding results are integrated to be output. The CPU 6 performs an image region searching process as in the third method and records information regarding the positions and the sizes of the barcode candidate region and the letter candidate region (Act D2). The CPU 6 performs the process using the information regarding the positions and the sizes in the cutting of the barcode region (Act D3) and the cutting of the letter region (Act D8).

The CPU 6 performs a decoding information integration process of integrating barcode decoding information (first barcode information) output in the decoding process performed on the barcode region 22 and the OCR decoding information (second barcode information) output in the decoding process (OCR process) performed on the letter region 23 based on the information regarding the positions and the sizes of the barcode region 22 and the letter region 23 (Act D13).

In the decoding information integration process, the CPU 6 determines whether the barcode region 22 and the letter region 23 are included in one barcode 12 based on the information regarding the positions and the sizes when the pieces of decoding information corresponding to the barcode region 22 and the letter region 23 are obtained. When the CPU 6 determines that the barcode region 22 and the letter region 23 are included in one barcode 12, the CPU 6 excludes the barcode information output as a target of one of the barcode region 22 and the letter region 23. In the decoding information integration process, the CPU 6 sets the decoding information as a reading result of the barcode 12 indicated by the information regarding the positions and the sizes when the decoding information of only one of the barcode region 22 and the letter region 23 is obtained. The CPU 6 repeatedly performs the above-described processes on each of the plurality of barcodes 12 detected from the photographed region 11.

In the fourth method, by decoding the barcode region 22 and the letter region 23 in parallel and integrating the results, the decoding information (barcode information) represented by the barcode 12 can be complementarily obtained through the OCR process performed on the letter region 23 even when the barcode region 22 may not be detected due to a certain cause.

Next, an example in which a different code image from the above-described barcode image 12a is a processing target will be described. Here, for example, labels such as price tags of commodities attached as management tags for managing shelves on which commodities or articles are displayed will be set as targets in the description. The labels are printed in, for example, a predetermined format and are posted on commodities or in showcases.

Figure 11A:
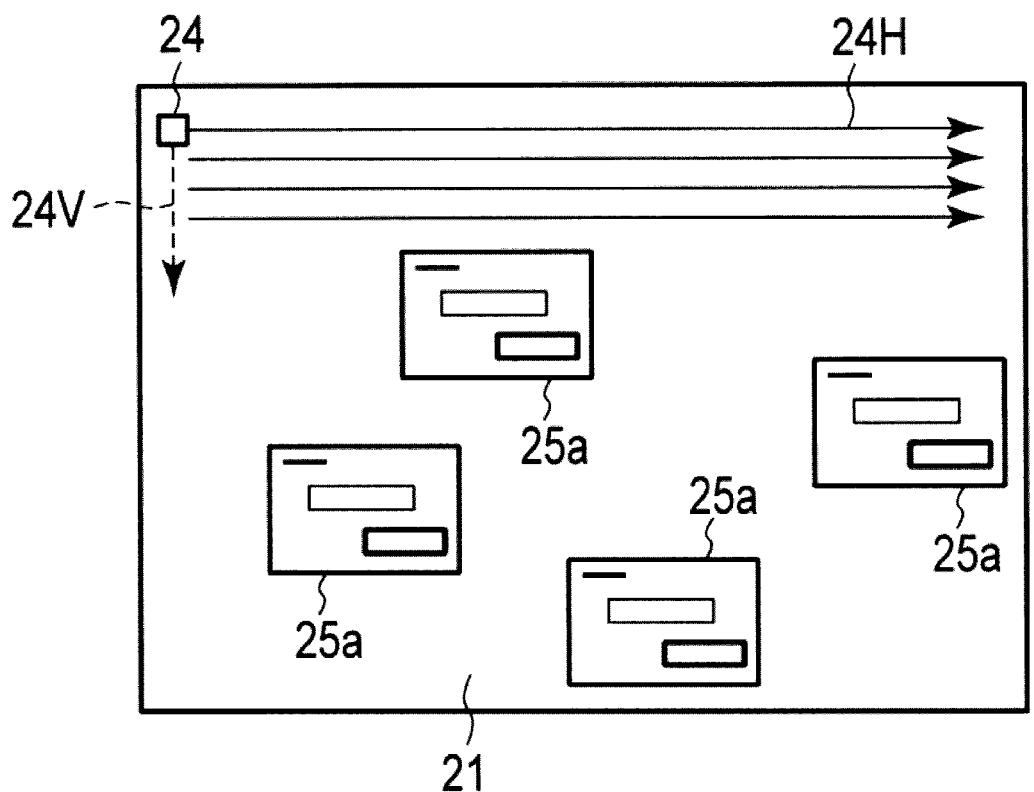
FIGS. 11A and 11B are diagrams schematically illustrating a method of searching for a label image equivalent to a label included in a photographed image according to the first embodiment.
Figure 11B:
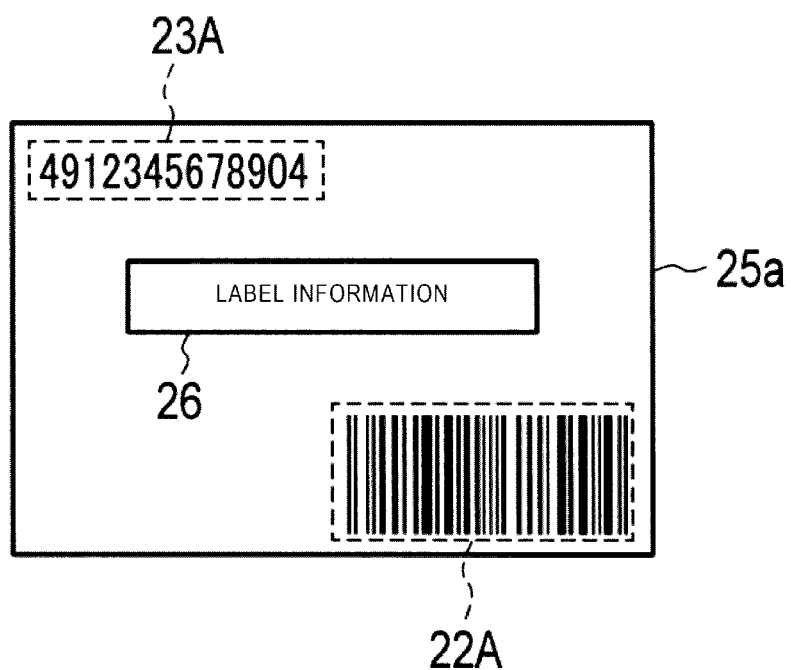

FIGS. 11A and 11B are diagrams schematically illustrating a method of searching for a label image 25a equivalent to a label included in the photographed image 21 photographed by the barcode reading unit 2 according to the first embodiment. In the barcode image 12a illustrated in FIG. 5B, the letter region 23 is formed near the vicinity of the barcode region 22. In a label image 25a illustrated in FIG. 11B, however, a letter region 23A is formed at a position distant from a barcode region 22A. The label image 25a includes label information 26 in addition to the barcode region 22A and the letter region 23A.

As illustrated in FIG. 11A, as described above, the CPU 6 sets a search region 24 with a small area with respect to the photographed image 21, sequentially scans the photographed image 21 in a horizontal direction 24H and a vertical direction 24V, and detects a label region with a format illustrated in FIG. 11B.

Figure 12:
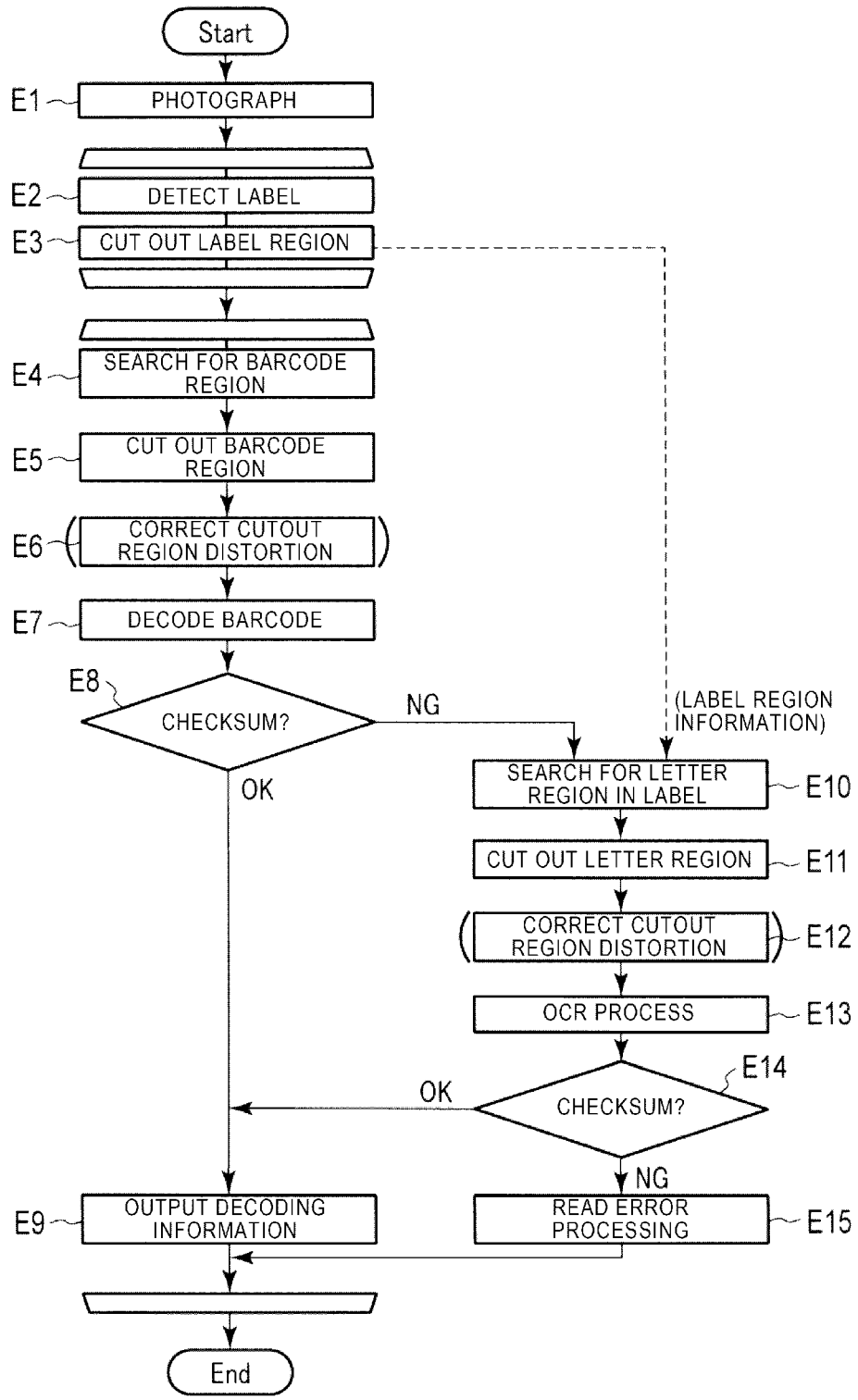
FIG. 12 is a flowchart illustrating a fifth method of reading a barcode with the barcode recognition device according to the first embodiment.

FIG. 12 is a flowchart illustrating a fifth method of reading a barcode with the barcode recognition device 1 according to the first embodiment. In the fifth embodiment, as illustrated in FIG. 11B, a process of reading the barcode region 22A and the letter region 23A formed separately in the label image 25a is indicated. In the fifth method, different processes from that of the first method illustrated in FIG. 6 will be described.

In the label image 25a, the letter region 23A is not disposed near the barcode region 22A, but the letter region 23A disposed at a predetermined position in the label image 25a is used. That is, when a disposition relation between candidates for the barcode region 22A and candidates for the letter region 23A is equivalent to the format illustrated in FIG. 11B, the CPU 6 detects a label as a label region equivalent to the label image 25a (Act E2). The CPU 6 temporarily records information regarding a position and a size indicating the detected label region as label region information in the RAM 7 (memory buffer) (Act E3). The CPU 6 repeats the process of cutting out the label region of each of the plurality of label images 25a included in the photographed image 21 (Acts E2 and E3).

Next, based on the detected label region information, the CPU 6 searches for the barcode region 22A from the label image 25a and decodes the barcode (barcode pattern) of the barcode region 22A (Acts E4 to E7). When a decoding result of the barcode is checksum NG (NG in Act E8) and the letter region 23A is cut out, the CPU 6 searches for the letter region 23A in the label image 25a using the information regarding the position and the size recorded as the label region information recorded on the RAM 7 (Act E10) and cuts out the letter region 23A (Act E11).

In this way, when the letter region 23A is searched for, the letter region 23A can be efficiently searched for utilizing the label region information. In this way, by performing pre-processing to detect the predetermined label image 25a (label region) from the photographed image 21, it is possible to search for the barcode region 22A and the letter region 23A efficiently and precisely even when the barcode region 22A and the letter region 23A are separated. It is possible to determine whether the candidates for the barcode region 22 or the candidates for the letter region 23 in the label. In particular, when an unrelated barcode is photographed together, it is possible to improve detection precision.

Second Embodiment

Figure 14:
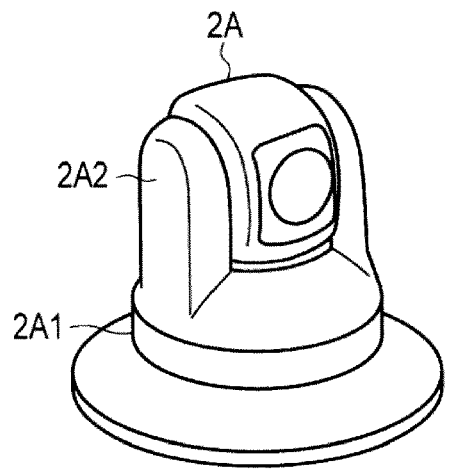
FIG. 14 is an external view illustrating a photographing device that photographs a commodity shelf or the like included in a barcode region or a letter region according to the second embodiment.

A barcode recognition device 1A according to a second embodiment reads barcode information about the barcode region 22 and the letter region 23 as targets, as in the first embodiment. Further, the barcode recognition device 1A detects a position (3-dimensional position coordinates) of the barcode 12 in a 3-dimensional space using a photographing device 2A installed at a fixed location as a reading device that photographs an image including a barcode image or the like, instead of the barcode reading unit 2 in the first embodiment. FIG. 14 is an external view illustrating the photographing device 2A that photographs a commodity shelf or the like in which the barcode region 22 or the letter region 23 is included according the second embodiment.

The photographing device 2A is a so-called pan and tilt camera (PT camera) that has a pan (P) function (pattern unit 2A1) of rotating the camera in a horizontal direction and a tilt (T) function (a tilt unit 2A2) of rotating the camera in the vertical direction. Pan and tilt rotation centers are common. Even when a camera direction is set in any rotation angle (θ, φ), a viewpoint position of the camera is fixed to one point. The pan and tilt functions are often employed in monitoring cameras such as security cameras fixedly mounted on ceilings or the like and can be similarly applied to the photographing device 2A. A photographing device that has a zoom (Z) function in addition to the pan and tilt functions, that is, a pan, tilt, and zoom camera (PTZ camera), can also be used.

Figure 13:
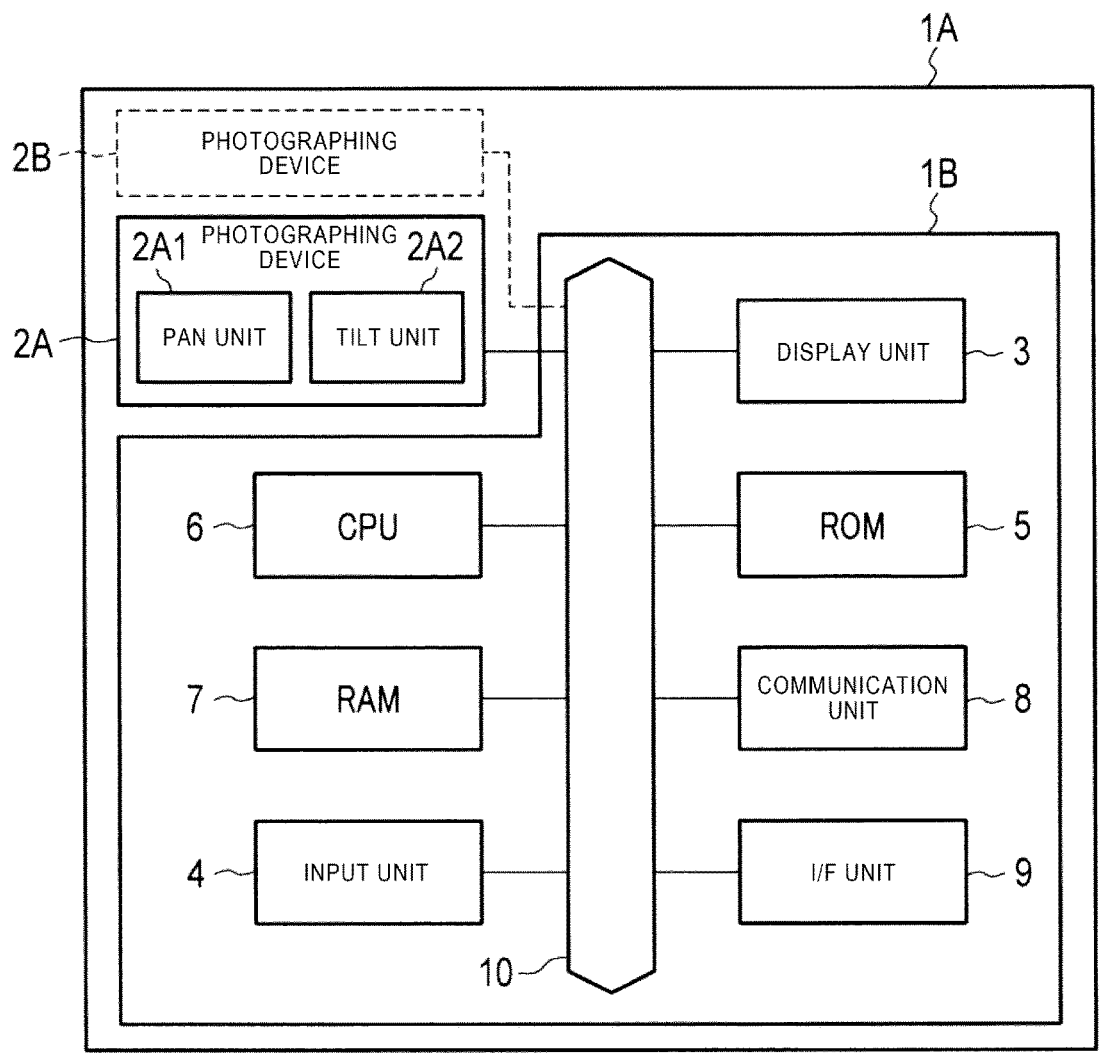
FIG. 13 is a block diagram illustrating a device configuration of a barcode recognition device according to a second embodiment.

FIG. 13 is a block diagram illustrating a device configuration of the barcode recognition device 1A according to the second embodiment. As illustrated in FIG. 13, the photographing device 2A is equivalent to the barcode reading unit 2 illustrated in FIG. 2. The barcode recognition device 1A can also include a plurality of photographing devices 2A and 2B. In the barcode recognition device 1A, a system configuration equivalent to a device function 1B of the CPU, the RAM, the communication unit, and the like illustrated in FIG. 2 can be constructed in a locally connected personal computer (PC), an on-premises server, or a cloud. The details of the device function 1B are substantially the same as those of the first embodiment, and thus the description thereof will be omitted. The device function 1B inputs images photographed by the photographing devices 2A and 2B and perform processes to be described below.

Figure 15A:
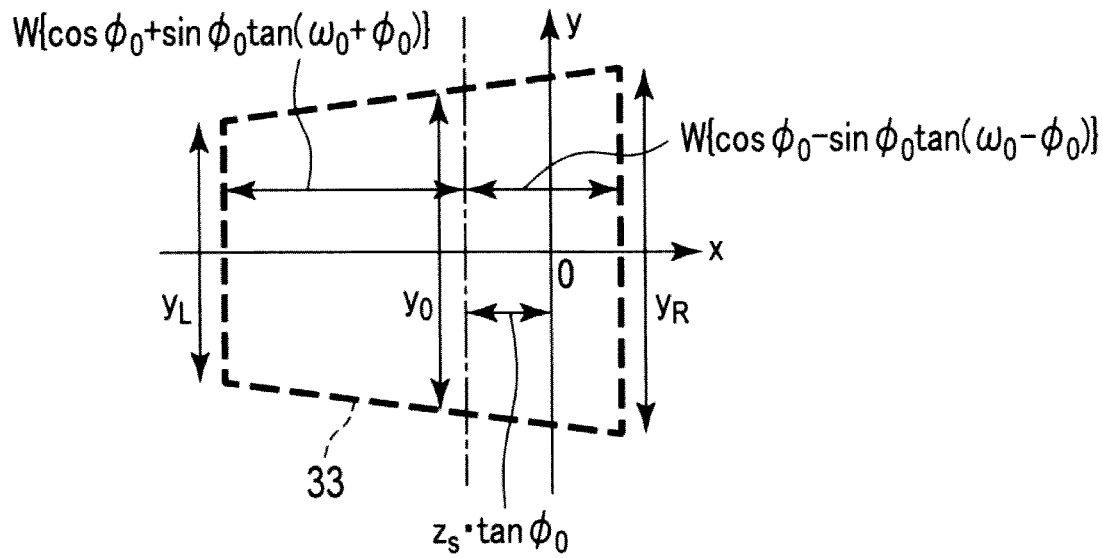
FIGS. 15A and 15B are diagrams illustrating positional relations between a shelf standard plane on which a barcode is disposed and a visual field standard plane at the time of photographing obtained from the photographing device and photographing parameters according to the second embodiment.
Figure 15B:
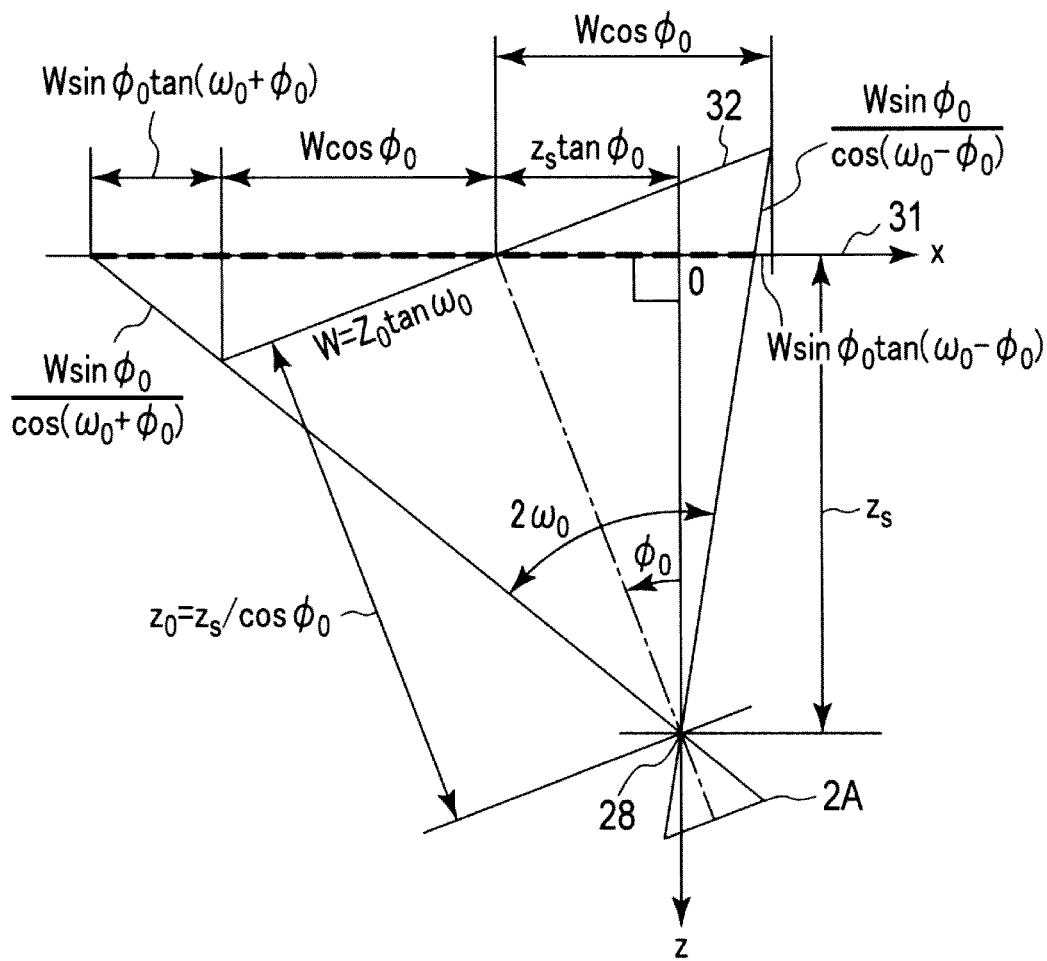

FIGS. 15A and 15B are diagrams illustrating, for example, a geometric relation of a label display plane (shelf standard plane 31) of a commodity shelf which serves as a standard of a photographing target with respect to photographing conditions of the photographing device 2A (the PT (PTZ) camera). In FIGS. 15A and 15B, x and y axes of the rectangular coordinate system are on the shelf standard plane 31. For simplicity, the photographing device 2A is on the z axis and a tilt angle θ is set to 0.

A viewpoint 28 serving as an installation standard position of the photographing device 2A is disposed at coordinates on the z axis from the origin of the rectangular coordinate system, that is, a position of a standard distance ($z_S$) between distance shelf and a camera from the shelf, and an angle φ of a pan direction is set to $\phi_0$. When a photographing horizontal view angle of the photographing device 2A is $2\omega_0$ and a distance between the axis of the camera to the shelf, that is, a distance between the shelf and the camera, is $z_0$, a photographing horizontal view angle boundary and the photographing device 2A, and an intersection position and a distance of the optical axis and the shelf standard plane 31 are illustrated in FIG. 15B. When a shelf shape of the shelf projected to a visual field standard plane 32 (width 2W) is assumed to be rectangular, the shape is distorted to a trapezoid as in a shelf-visual field standard projection plane 33 illustrated in FIG. 15A. A right side $Y_R$ and a left side $Y_L$ of the shelf-visual field standard projection plane 33 illustrated in FIG. 15A is expressed as the following expression.

$$y_R = \frac{y_0}{\cos\omega_0}\left\{1 + \frac{\sin\omega_0 \sin\varphi_0}{\cos(\omega_0 + \varphi_0)}\right\}$$

$$y_L = \frac{y_0}{\cos\omega_0}\left\{1 - \frac{\sin\omega_0 \sin\varphi_0}{\cos(\omega_0 + \varphi_0)}\right\}$$

Figure 16A:
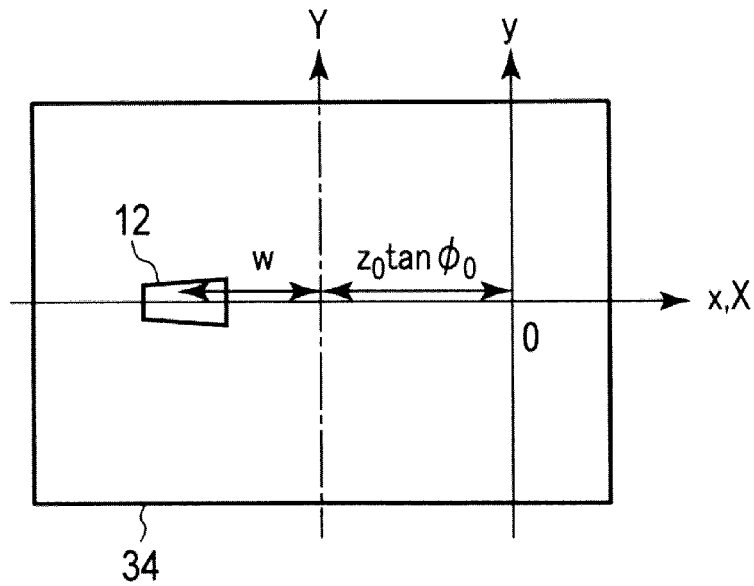
FIGS. 16A and 16B are diagrams illustrating relations between the parameters illustrated in FIGS. 15A and 15B in a visual field range when a barcode is disposed on the shelf standard plane according to the second embodiment.
Figure 16B:
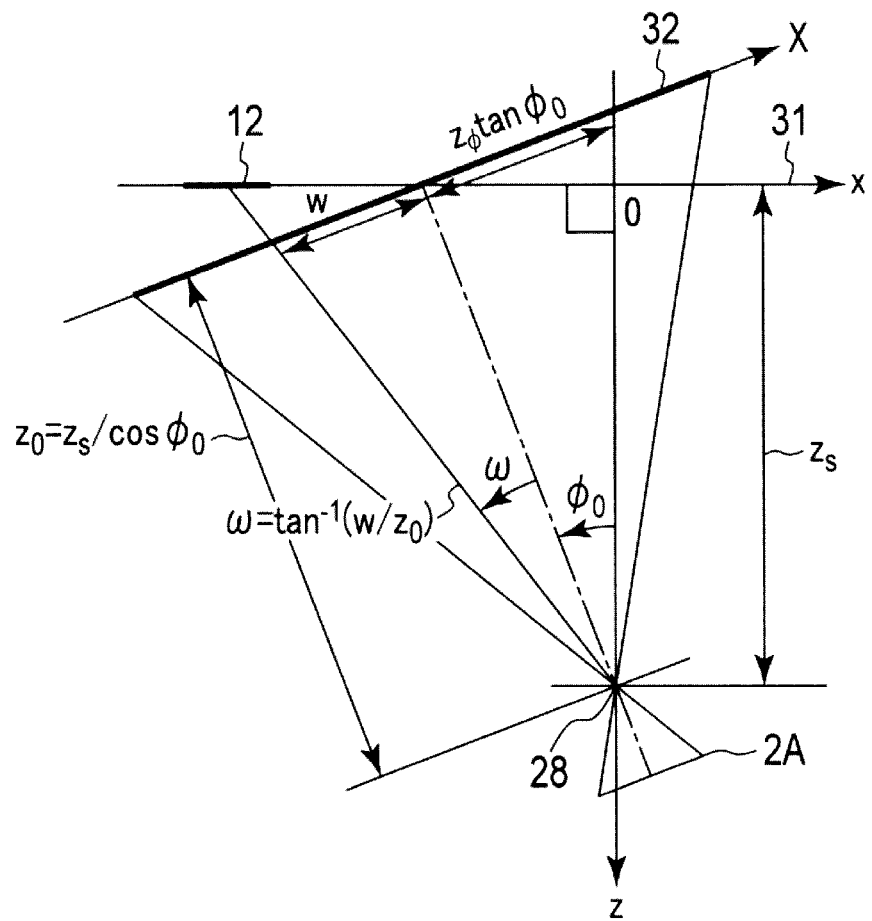

FIGS. 16A and 16B are diagrams illustrating relations between the parameters illustrated in FIGS. 15A and 15B in a visual field range 34 when the barcode 12 is disposed on the shelf standard plane 31. When a shelf-camera standard distance ($z_S$), a pan direction angle $\phi_0$, and a photographing horizontal view angle $\omega_0$ are known, a relation between the parameters and a distance w from the optical axis to the barcode 12 in the photographed visual field standard plane 32 is indicated, and thus coordinates on the x axis in the shelf standard plane 31 can be known to be restored from FIGS. 16A and 16B. That is, positional information of the barcode 12 in a 3-dimensional space of an actual shelf can be calculated from positional information of the barcode 12 in an image photographed by the photographing device 2A.

Figure 17:
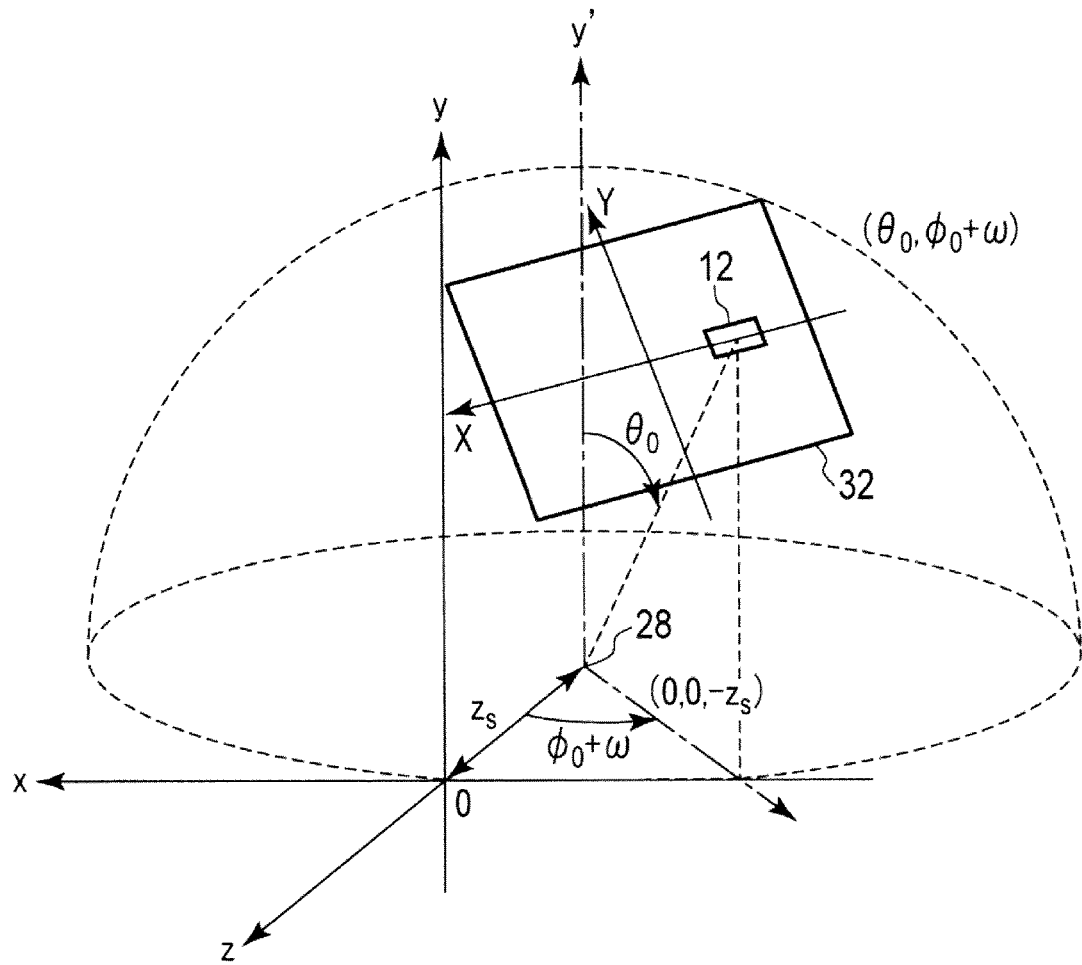
FIG. 17 is a diagram illustrating the relations illustrated in FIGS. 15A, 15B, 16A, and 16B more generally.

FIG. 17 is a diagram illustrating the relations illustrated in FIGS. 15A, 15B, 16A, and 16B more generally. The photographing device 2A (the viewpoint 28) is present at (0, 0, $-z_S$) of the rectangular coordinates (x, y, z) present on the shelf standard plane 31. The standard coordinates of an XY 2-dimensional plane of the local coordinate system of the visual field standard plane 32 and the position of the barcode 12 are expressed as a unit spherical coordinate system (θ, φ) at a y' axis moved in parallel to the y axis in the z axis direction. For example, in the example illustrated in FIG. 17, the position of the barcode 12 is ($\theta_0$, $\phi_0+\omega$) and can be projected finally to the coordinate system of the self standard plane 31 from the position on the XY orthogonal axes of the local coordinate system of the above-described visual field standard plane 32. The shelf-camera standard distance ($z_S$) may be given fixedly in advance as a set value or an optical measurement unit such as a laser distance meter may be installed. A distance can be predicted indirectly from the lens conditions and a focus position of the photographing device 2A (the camera). Similarly, since a distance between the photographing device 2A (the camera) and the barcode 12 can be measured indirectly or directly in accordance with the above-described method, the positional information of the barcode 12 can be mapped to 2-dimensional coordinates of the shelf standard plane and can also be mapped to 3-dimensional coordinates.

Figure 18:
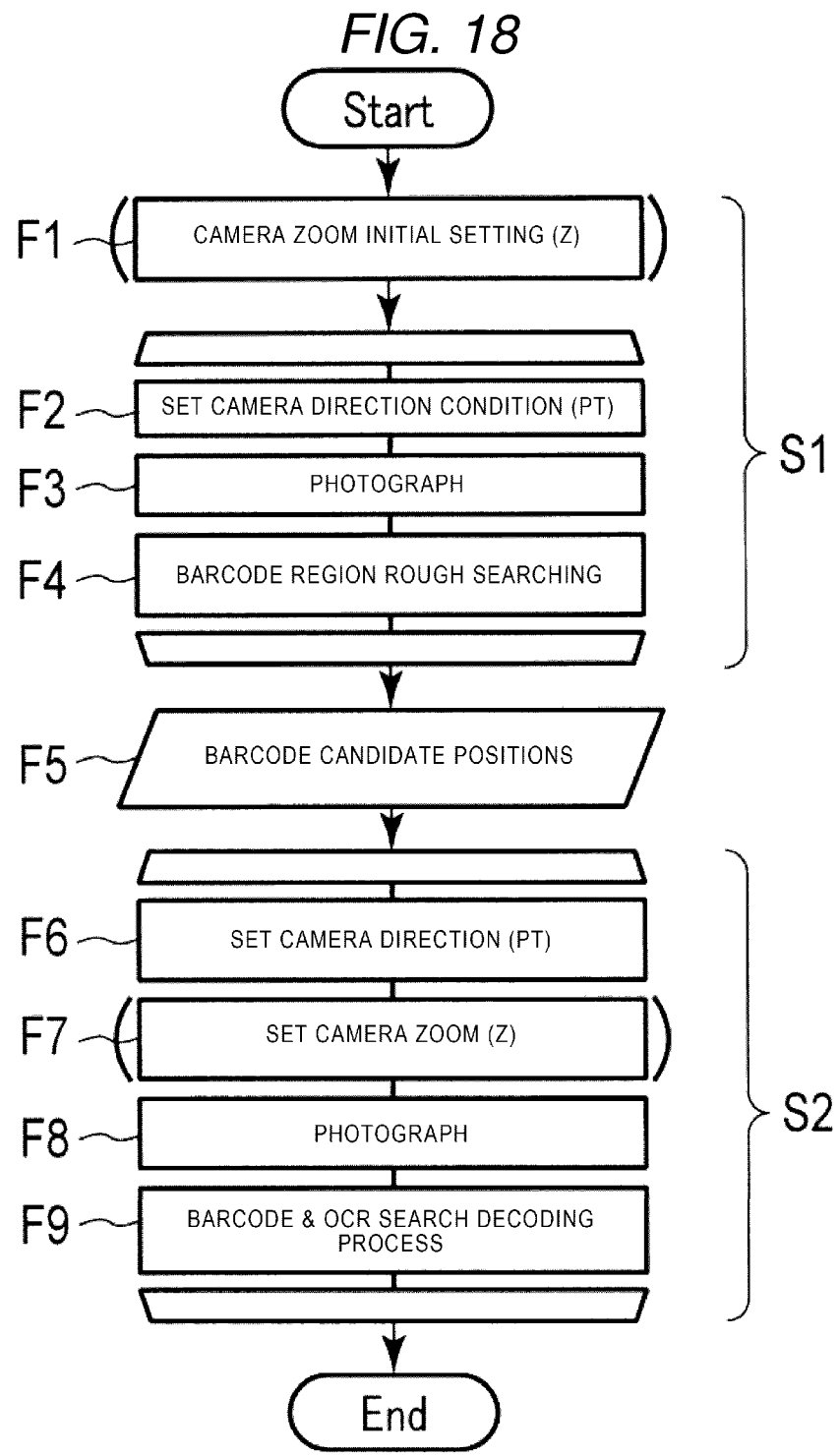
FIG. 18 is a flowchart illustrating a method of reading a barcode with the barcode recognition device according to the second embodiment.

FIG. 18 is a flowchart illustrating a method of reading a barcode with the barcode recognition device 1A according to the second embodiment. In the second embodiment, photographing is performed by dividing processes into two stages, that is, previous-stage processes (Acts F1 to F4) of roughly searching for barcode candidate regions (a rough searching process S1) and a later-stage processes (Acts F6 to F9) of performing detail searching by photographing nearby regions based on barcode positional information detected in the rough searching process S1 (a detail searching process S2).

In the rough searching process S1, the CPU 6 sets a photographing direction of the photographing device 2A (camera direction condition), performs photographing (Acts F2 and F3), and then searches for a barcode image (barcode region 22) from a photographed image (Act F4). Here, the CPU 6 performs rough searching in which a processing burden is light to search for candidates for a barcode region rather than accurate searching and records positions (information regarding positions and sizes) of the barcode candidates indicating positions which are candidates for the barcode region on the RAM 7 (Act F5). The CPU 6 performs photographing while changing the photographing direction of the photographing device 2A and records photographing barcode candidate positions of the candidates for the barcode region searched from the photographed images (Acts F2 to F4).

Next, in the detail searching process S2, the CPU 6 sets the photographing direction (camera direction) of the photographing device 2A according to the camera direction condition setting in the rough searching process S1 and performs photographing (Acts F6 and F7). The CPU 6 reads the barcode information setting the barcode region 22 and the letter region 23 as targets using the photographing barcode candidate positions corresponding to the candidates for each barcode region as in the first embodiment (Act F9). The process of Act F9 is performed as in the processes of Acts A2 to A11 in the first embodiment, as indicated by a dotted line of FIG. 6, and thus the description thereof will be omitted.

In this way, in the second embodiment, the barcode candidate positions searched through the rough searching process S1 are set as targets and the detail searching process S2 is performed setting the barcode region 22 and the letter region 23 as targets. Therefore, it is possible to shorten a processing time because of efficiency of the photographing and a searching time.

In the second embodiment, a pan, tilt, and zoom camera (PTZ camera) that has a zoom (Z) function can also be used as the photographing device 2A. In this case, in the rough searching process S1, camera zoom initial setting is performed on the photographing device 2A (Act F1) to perform photographing so that the barcode image with quality necessary for rough searching can be obtained. In the detail searching process S2, the CPU 6 sets camera zoom setting to perform photographing so that a more detailed barcode image than in the rough searching process S1 can be obtained (Act F7). That is, since the barcode information is recognized setting a high-resolution barcode image as a target using a zoom (Z) photographing function in the detail searching process S2, recognition precision can be expected to be improved.

Figure 19:
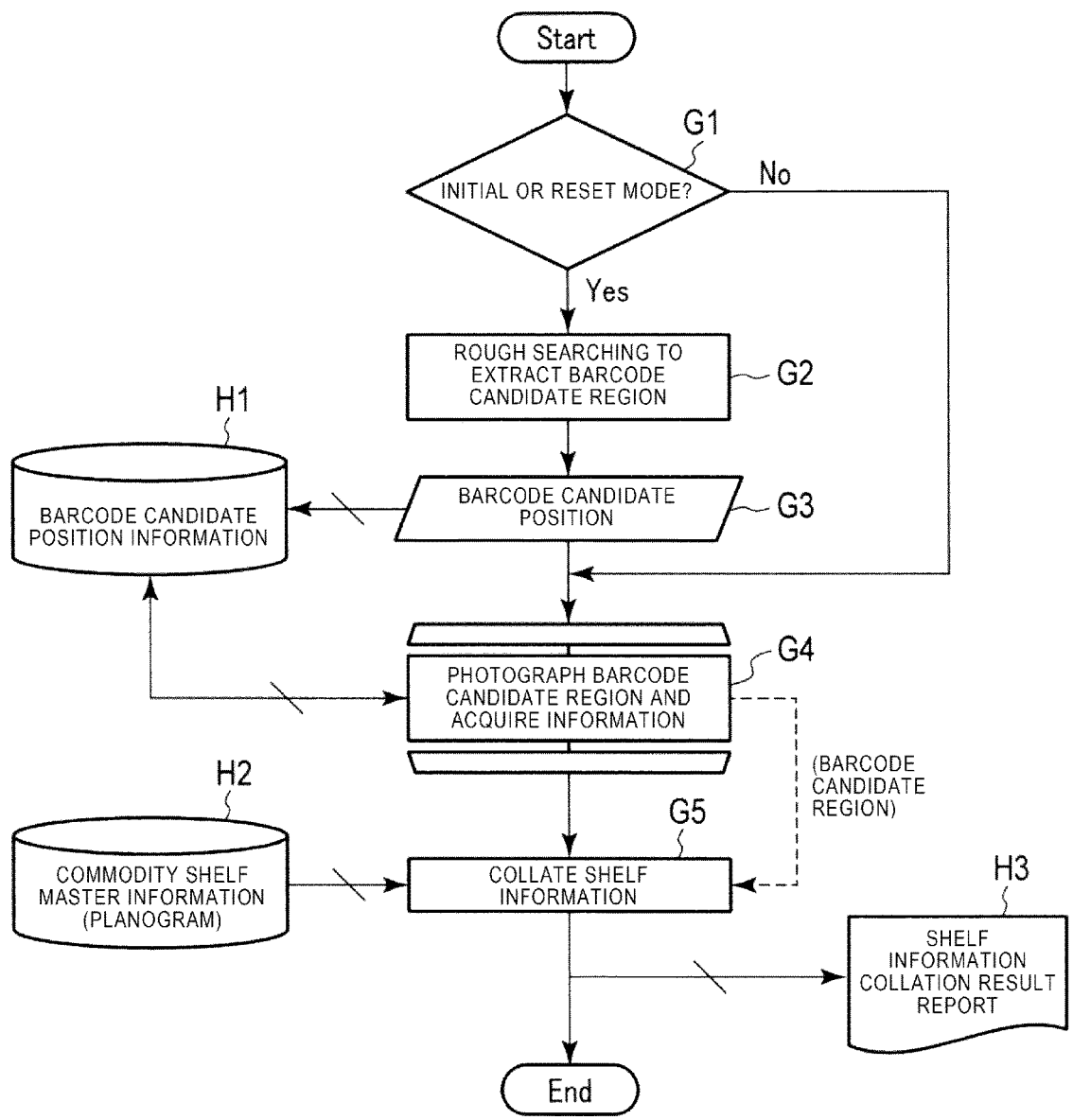
FIG. 19 is a flowchart illustrating a first modification example in which a barcode is read with the barcode recognition device according to the second embodiment.

FIG. 19 is a flowchart illustrating a first modification example in which a barcode is read with the barcode recognition device 1A according to the second embodiment. In a process illustrated in FIG. 19, a process of outputting, as a report, a result obtained by comparing and referring to commodity shelf master information (planogram) regarding a commodity shelf to which a barcode is further attached and positional information of the barcode read from an actually photographed image is provided on the basis of the process illustrated in FIG. 18. The commodity shelf master information (planogram) is, for example, a database of commodity shelf division plan and is information indicating which commodity is accommodated at which position of the commodity shelf.

Here, for example, a shelf information collation process is performed a plurality of times periodically as the premise that information regarding barcodes posted on a commodity shelf is not considerably changed. When barcode information regarding barcodes attached to the commodity shelf is first read or a previous reading result is reset and read again (Yes in Act G1), the CPU 6 detects barcode candidate positions (Act G2) in the rough searching process S1 illustrated in FIG. 18 and records the barcode candidate positions as barcode candidate position information (H1) on the RAM 7 (Act G3).

When reading subsequent to second reading is performed (No in Act G1), the CPU 6 performs the information acquisition process in the detail searching process S2 illustrated in FIG. 18 with reference to the barcode position information (H1) (Act G4). In Act G4, the CPU 6 can start photographing barcode candidate regions of the later-stage and the detail searching process S2 (Act G4) without performing photographing of all the target regions and the rough searching process S1 (Act G2).

When more appropriate barcode position information is obtained in the photographing of the barcode candidate regions and the information acquisition process (Act G4), the CPU 6 performs an updating process by writing the barcode position information on the barcode candidate position information (H1). On the other hand, the CPU 6 records barcode position decoding information regarding the barcode candidate regions obtained as the result of the photographing of the barcode candidate regions and the information acquisition process (Act G4) on the RAM 7.

The CPU 6 performs a shelf information collation process of comparing and collating the barcode position decoding information and commodity shelf master information (planogram) (H2) (Act G5). In the shelf information collation process, the CPU 6 determines whether the barcode position information and the barcode information read from a photographed image match the commodity shelf master information. When the CPU 6 determines that the barcode position information and the barcode information are identical to the commodity shelf master information, the CPU 6 confirms that shelf division of the actual commodity shelf is performed correctly and as planned, displays a warning in unmatched information and collectively outputs the result as a report (H3).

In this way, by detecting the position information of the barcode (barcode position decoding information), it is possible to compare the barcode position decoding information with the commodity shelf master information and it is possible to easily perform an inventory work or an inspection work in which matched information between the positional information of the commodities or the shelf and the barcode information is necessary. Since the photographing device 2A can perform omnidirectional photographing from an installation location, an analysis work can be performed automatically in the commodity shelf in the periphery of the photographing device 2A, and thus manpower saving and labor saving can be achieved.

Figure 20:
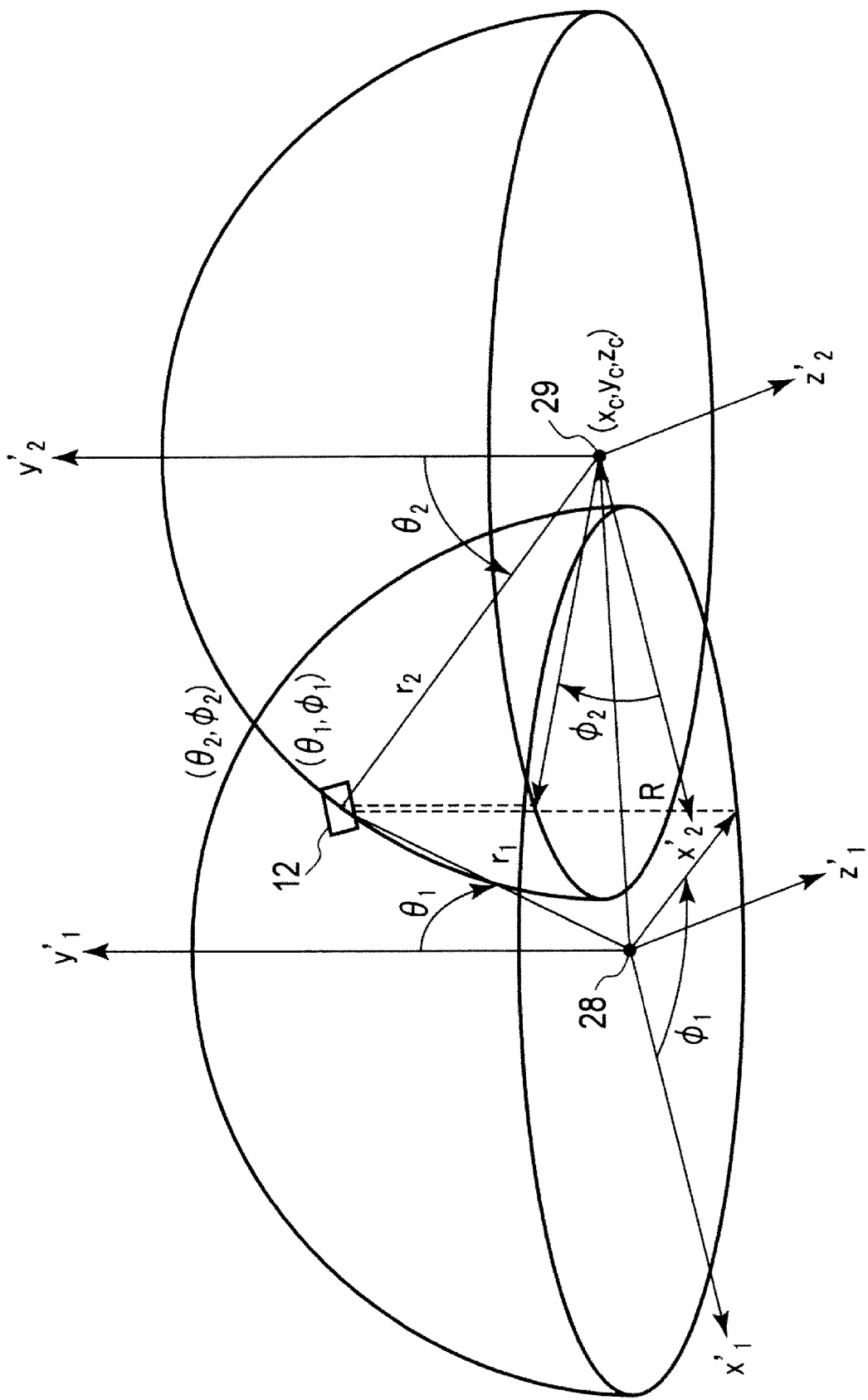
FIG. 20 is a diagram illustrating a second modification example in which a barcode is read with the barcode recognition device according to the second embodiment.

FIG. 20 is a diagram illustrating a second modification example in which a barcode is read with the barcode recognition device 1A according to the second embodiment. In FIG. 20, the plurality of photographing devices 2A and 2B (two photographing devices in FIG. 20) are used to photograph a common range. In FIG. 20, a distance between the installation positions of the photographing devices 2A and 2B is assumed to be R. The barcode recognition device 1A sets a photographed image photographed at the viewpoint 28 (the photographing device 2A) which is a first camera photographing position as a target and performs searching of a barcode position and a decoding process based on the above-described processes, and then similarly performs the searching of the barcode position and the decoding process at the viewpoint 29 (the photographing device 2B) which is a second camera photographing position.

When such processes are performed, at least components $(\theta_1, \phi_1)$ and $(\theta_2, \phi_2)$ at unit spherical coordinates can be obtained for a certain barcode 12 between position coordinates $(r_1, \theta_1, \phi_1)$ in a local coordinate system $(x_1, y_1, z_1)$ based on the first viewpoint 28 and position coordinates $(r_2,$ $\theta_2$, $\phi_2$) in a local coordinate system ($x_2$, $y_2$, $z_2$) based on a second viewpoint 29. Here, when the distance R and a direction between the first viewpoint 28 and the second viewpoint 29 are known, coordinates ($x_C$, $y_C$, $z_C$) of the second viewpoint 29 with respect to the first viewpoint 28 are known. Therefore, unknown distance components $r_1$ and $r_2$ are obtained from values of position coordinates ($\theta_1$, $\phi_1$) and ($\theta_2$, $\phi_2$) of the barcodes obtained at the local coordinates at the two viewpoints, for example, using a pair of position coordinate components in the plurality of barcodes 12. Finally, 3-dimensional position coordinates of the barcodes in the global coordinate system can be obtained.

Here, it is assumed that relative position coordinates ($x_C$, $y_C$, $z_C$) of the first viewpoint 28 and the second viewpoint 29 are known and the distance components $r_1$ and $r_2$ of the barcode 12 at the local coordinates are unknown. However, distances r from the photographing devices 2A and 2B (cameras) to the barcode 12 can be known in accordance with photographing parameters of the cameras or by a distance measurement unit for laser ranging. Therefore, the position coordinates ($x_C$, $y_C$, $z_C$) of the second viewpoint 29 with respect to the first viewpoint 28 can be obtained from a pair of local position coordinates ($r_1$, $\theta_1$, $\phi_1$) and ($r_2$, $\theta_2$, $\phi_2$) of the plurality of barcodes 12. That is, even when the position of the second viewpoint 29 is unknown, 3-dimensional position coordinates of each barcode 12 can also be obtained. Even when the position coordinates ($x_C$, $y_C$, $z_C$) and the distance components $r_1$ and $r_2$ of the barcode 12 are unknown, 3-dimensional position coordinates can be each identified from the pair of position coordinates of ($\theta_1$, $\phi_1$) and ($\theta_2$, $\phi_2$) between two points in the numerous barcodes 12.

Methods for camera photographing at two points or a plurality of points illustrated in FIG. 20 are broadly classified into a method of performing photographing from fixed viewpoints while partially overlapping photographing visual fields using the same kind of two photographing devices 2A and 2B and a method of performing photographing by moving one photographing device 2A between two viewpoints. As an example of the former, a method of preparing a plurality of monitoring cameras on ceilings and performing searching and decoding of the barcodes 12 using monitored images can be exemplified. As an example of the latter, a method of mounting a camera on a moving object such as an autonomous moving robot or a moving carriage and repeatedly moving and photographing while overlapping parts of photographing ranges can be exemplified in addition to a method of providing artificially two photographing positions for each measurement. In the latter case, it is possible to photograph the same barcode from two or more viewpoints, for example, three viewpoints and obtain 3-dimensional position coordinates in the global coordinate system from three pairs of local direction coordinate components while identifying the same barcode from the barcode decoding information or peripheral image information.

In this way, by setting photographed images photographed at a plurality of positions as targets, reading barcodes, and detecting barcode positions, it is possible to detect, from a distant position, the plurality of barcodes 12 disposed in a wide range in, for example, a space such as a warehouse or a shop and provide the barcode recognition device capable of reading the barcode information efficiently. Further, it is possible to read the barcode information and provide a commodity management system capable of obtaining positional information in the space of the barcodes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The processes described in the above-described embodiments can be written on, for example, a recording medium such as a magnetic disk (a flexible disk, a hard disk, or the like), an optical disc (a CD-ROM, a DVD, or the like), or a semiconductor memory as a program which can be executed by a computer to be provided to various devices. The program can also be transmitted through a communication medium to be provided to various devices. A computer reads the program recorded on a recording medium or receives the program via a communication medium, and then performs the above-described processes when an operation is controlled by the program.

What is claimed is:

1. A code recognition device comprising: a reader for photographing a code image; a processor for detecting a code region and a letter region included in the code image from the code image photographed by the reader, for extracting a first code information represented by the code image from the code region, and for extracting a second code information represented by the code image from the letter region, wherein the processor is configured to perform an OCR process to recognize a letter string in the letter region after performing a distortion correction process to correct geometric distortion of the letter region; wherein when the reader photographs a code image with a camera that has pan and tilt functions, and wherein the device further comprises a processor for detecting a position of the code image based on a position of the code region in the code image and pan and tilt information indicating a direction of the camera adjusted using the pan and tilt functions.

2. The device according to claim 1,
   wherein the processor extracts the second code information from the letter region when the first extraction may not extract the first code information.

3. The device according to claim 2, further comprising:
   a processor for integrating the first code information with the second code information.

4. The device according to claim 2,
   wherein the reader photographs a code image with a camera that has pan and tilt functions, and
   wherein the device further comprises:
   a processor for detecting a position of the code image based on a position of the code region in the code image and pan and tilt information indicating a direction of the camera adjusted using the pan and tilt functions.

5. The device according to claim 1, further comprising:
   a processor for integrating the first code information with the second code information.

6. The device according to claim 5,
   wherein the reader photographs a code image with a camera that has pan and tilt functions, and
   wherein the device further comprises:
   a processor for detecting a position of the code image based on a position of the code region in the code image and pan and tilt information indicating a direction of the camera adjusted using the pan and tilt functions.

7. The device according to claim 1, wherein the reader photographs a code image with a camera that has pan and tilt functions; wherein the processor detects the code region from a plurality of code images photographed by the reader at a plurality of different positions, and wherein the processor detects a position of a code equivalent to the code image in 3-dimensional space based on a position of the code region detected from the plurality of images and pan and tilt information indicating a plurality of directions of the camera.

8. A method for performing code recognition, comprising: photographing a code image by a reader detecting, by a processor, a code region and a letter region included in the code image from the code image photographed by the reader; extracting, by the processor, a first code information represented by the code image from the code region; extracting, by the processor, a second code information represented by the code image from the letter region, wherein extracting the second code information comprises: performing an OCR process, by the processor, to recognize a letter string in the letter region after performing a distortion correction process to correct geometric distortion of the letter region; detecting, by the processor, the code region from a plurality of code images photographed by the reader at a plurality of different positions; and detecting, by the processor, a position of a code equivalent to the code image in a 3-dimensional space based on a position of the code region detected from the plurality of images and pan and tilt information indicating a plurality of directions of the camera.

9. The method according to claim 8, further comprising: extracting, by the processor, the second code information from the letter region when the first extraction does not extract the first code information.

10. The method according to claim 9, further comprising: integrating, by the processor, the first code information with the second code information.

11. The method according to claim 9, further comprising: photographing, by the reader, a code image with a camera that has pan and tilt functions; and detecting, by the processor, a position of the code image based on a position of the code region in the code image and pan and tilt information indicating a direction of the camera adjusted using the pan and tilt functions.

12. The method according to claim 8, further comprising: integrating, by the processor, the first code information with the second code information.

13. The method according to claim 12, further comprising:
photographing, by the reader, a code image with a camera that has pan and tilt functions; and
detecting, by the processor, a position of the code image based on a position of the code region in the code image and pan and tilt information indicating a direction of the camera adjusted using the pan and tilt functions.

14. The method according to claim 8, further comprising:
photographing, by the reader, a code image with a camera that has pan and tilt functions; and
detecting, by the processor, a position of the code image based on a position of the code region in the code image and pan and tilt information indicating a direction of the camera adjusted using the pan and tilt functions.

* * * * *